United States Patent
Saito

(10) Patent No.: US 7,800,796 B2
(45) Date of Patent: Sep. 21, 2010

(54) IMAGE FORMING APPARATUS

(75) Inventor: Daijiro Saito, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 932 days.

(21) Appl. No.: 11/649,307

(22) Filed: Jan. 3, 2007

(65) Prior Publication Data

US 2007/0291327 A1 Dec. 20, 2007

(30) Foreign Application Priority Data

Jun. 19, 2006 (JP) ............................. 2006-169175

(51) Int. Cl.
 *H04N 1/04* (2006.01)
(52) U.S. Cl. ...................................... 358/496; 358/498
(58) Field of Classification Search .................. 358/1.2, 358/1.4, 1.6, 1.9, 2.1, 500, 501, 451, 496, 358/498, 1.1, 1.14; 348/222.1
See application file for complete search history.

(56) References Cited

U.S. PATENT DOCUMENTS

| | | | |
|---|---|---|---|
| 5,398,101 A | | 3/1995 | Takada et al. |
| 6,041,175 A * | | 3/2000 | Fukada et al. ................. 703/21 |
| 6,731,887 B1 | | 5/2004 | Wibbels et al. |
| 7,038,818 B2 * | | 5/2006 | Namizuka et al. ........... 358/468 |
| 2001/0015821 A1 * | | 8/2001 | Namizuka et al. .......... 358/1.15 |
| 2003/0025974 A1 * | | 2/2003 | Mushiake et al. ........... 359/205 |
| 2003/0043256 A1 | | 3/2003 | Conrow et al. |
| 2004/0036847 A1 | | 2/2004 | Conrow et al. |
| 2004/0046972 A1 * | | 3/2004 | Shibao ........................ 358/1.1 |
| 2004/0165081 A1 * | | 8/2004 | Shibaki et al. ............ 348/222.1 |
| 2004/0190927 A1 | | 9/2004 | Tsukamoto et al. |
| 2006/0028684 A1 * | | 2/2006 | Namizuka et al. .......... 358/1.16 |
| 2006/0159480 A1 | | 7/2006 | Mima et al. |
| 2006/0164505 A1 * | | 7/2006 | Maeda ....................... 347/234 |
| 2007/0059042 A1 * | | 3/2007 | Honda ........................ 399/196 |

FOREIGN PATENT DOCUMENTS

| | | |
|---|---|---|
| EP | 1 292 115 A2 | 3/2003 |
| EP | 1 688 265 A2 | 8/2006 |

(Continued)

OTHER PUBLICATIONS

Japanese Office Action (and English translation thereof) dated Apr. 22, 2008, issued in a counterpart Japanese Application.

*Primary Examiner*—Jerome Grant, II
(74) *Attorney, Agent, or Firm*—Frishauf, Holtz, Goodman & Chick, P.C.

(57) ABSTRACT

An image forming apparatus includes: an image forming section to perform an image formation onto a recording medium which moves relatively in a sub scanning direction, the image forming section including a writing unit including a writing element; an image processing section to convert a data for driving the writing unit based on an input image data; a zoom ratio setting section to set zoom ratios of an image in a main scanning direction respectively associated with position in the image in the sub scanning direction; and a controlling section to control the image formation in the writing unit, based on the data for driving the writing unit which has been converted in the image processing section based on the zoom ratio set on the zoom ratio setting section.

14 Claims, 14 Drawing Sheets

FOREIGN PATENT DOCUMENTS

| | | |
|---|---|---|
| JP | 06-332275 A | 12/1994 |
| JP | 2001-282042 A | 10/2001 |
| JP | 2003-312081 A | 11/2003 |
| JP | 2004-219477 A | 8/2004 |
| JP | 2005-186337 A | 7/2005 |
| JP | 2006-082469 A | 3/2006 |

* cited by examiner

IMAGE FORMING APPARATUS

CROSS REFERENCE TO RELATED APPLICATIONS

The present U.S. patent application claims a priority under the Paris Convention of Japanese patent application No. 2006-169175 filed on Jun. 19, 2006, which shall be a basis of correction of an incorrect translation.

BACKGROUND

1. Field of the Invention

The present invention relates to an image forming apparatus.

2. Description of Related Art

In earlier development, an image forming apparatus has been known, in which an electrostatic latent image is formed on a photoconductor drum with an LED head writing optical system where writing elements such as a plurality of light-emitting diodes (LEDs) are arranged in line and a toner image formed by adhering a toner to the electrostatic latent image is transferred to and fixed on a recording medium such as a paper so as to form an image. Some of these image forming apparatus can form images on both sides of a recording medium (have a double-sided mode), and form an image onto a backside following a front side.

When images are formed on both sides of a recoding medium as above, it is known that the recording medium shrinks at the time of forming an image on one side. This is because the recording medium to which a toner image has been transferred shrinks by heat in a fixing step. The thicker the recording medium, the more remarkable the extent of the heat shrinkage is. The deformation due to such heat shrinkage eliminates gradually after the image formation by the recording medium absorbing moisture in the air.

Therefore, in the above-described image forming apparatus, it is required to give minute deformation processing in a pixel-level according to use. Especially in a double-sided image formation, an image is formed to the backside before the deformation of the recording medium due to heat shrinkage is eliminated. Thus, it is required to perform minute deformation processing as a heat shrinkage measure. For example, it is required to form an image of the backside with a minutely reduced size than that of the front side.

As for a technique to correct such distortion of images formed on the front side and backside, JP 2005-186337A discloses setting tilts in a main scanning direction and sub scanning direction to correct a distortion of an image data based on the tilts.

However, according to this technique, an image to be formed on a recording medium is corrected only based on the tilts in main scanning direction and sub scanning direction. Thus, image formation cannot be performed flexibly, and the image aspect to be formed on each side cannot be corrected precisely in conformity with the distortion of the recording medium.

SUMMARY

The present invention has been made in consideration of the above problem. It is one of objects of the present invention to provide an image forming apparatus which can adjust an aspect of an image to be formed flexibly and precisely according to distortion of a recording medium. Further, it is another object of the present invention to provide an image forming apparatus which can adjust aspects of images to be formed in double-sided image formation flexibly and precisely according to distortion of an recording medium.

In order to attain at least one of the above objects, according to one embodiment which reflects a first aspect of the present invention, an image forming apparatus comprises: an image forming section to perform an image formation onto a recording medium which moves relatively in a sub scanning direction, the image forming section comprising a writing unit including a writing element; an image processing section to convert a data for driving the writing unit based on an input image data; a zoom ratio setting section to set zoom ratios of an image in a main scanning direction respectively associated with positions in the image in the sub scanning direction; a controlling section to control the image formation in the writing unit, based on the data for driving the writing unit which has been converted in the image processing section based on the zoom ratios set on the zoom ratio setting section.

According to one embodiment which reflects a second aspect of the present invention, an image forming apparatus comprises: an image forming section to perform an image formation onto a recording medium which moves relatively in a main scanning direction, the image forming section comprising a writing unit including a writing element; an image processing section to convert a data for driving the writing unit based on an input image data; a zoom ratio setting section to set zoom ratios of an image in a sub scanning direction respectively associated with positions in the image in the main scanning direction; a controlling section to control the image formation in the writing unit, based on the data for driving the writing unit which has been converted in the image processing section based on the zoom ratios set on the zoom ratio setting section.

According to one embodiment which reflects a third aspect of the present invention, an image forming apparatus comprises: an image forming section to perform an image formation onto a recording medium which moves relatively in a sub scanning direction, the image forming section comprising a writing unit including a writing element; an image processing section to convert a data for driving the writing unit based on an input image data; a setting section to accept an input by an operator, so as to set a displacement of an image in the main scanning direction associated with a position in the image in the sub scanning direction; a controlling section to control the image formation in the writing unit, based on the data for driving the writing unit which has been converted in the image processing section based on the zoom ratio set on the zoom ratio setting section.

According to one embodiment which reflects a fourth aspect of the present invention, an image forming apparatus comprises: an image forming section to perform an image formation onto a recording medium which moves relatively in a sub scanning direction, the image forming section comprising a writing unit including a writing element; an image processing section to convert a data for driving the writing unit based on an input image data; a setting section to accept an input by an operator, so as to set a displacement of an image in the sub scanning direction associated with a position in the image in the main scanning direction; a controlling section to control the image formation in the writing unit, based on the data for driving the writing unit which has been converted in the image processing section based on the zoom ratio set on the zoom ratio setting section.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

Hereinafter, an embodiment of the present invention is described with reference to FIGS. 1 to 14. However, the present invention is not limited to the embodiment. Also, the embodiment is to show a best mode of the invention, and a use of the invention and definition of the terms used therein are not limited thereto.

Figure 1:
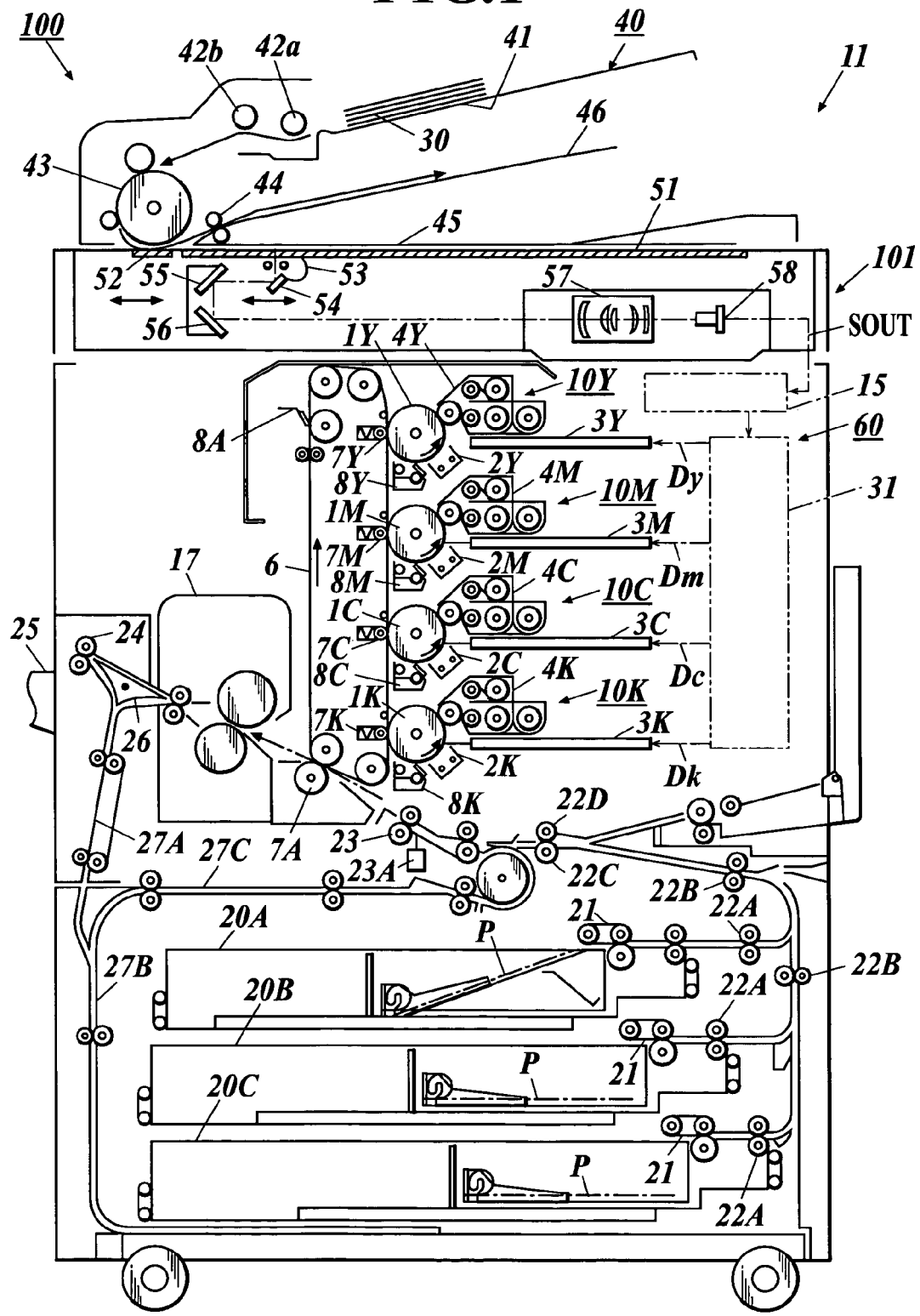
FIG. 1 is an outline view showing an internal composition of an color copier 100 of the present embodiment.

First, an outline composition of a color copier 100 is described. As shown in FIG. 1, the color copier 100 is one example of the image forming apparatus, and is to acquire image information by reading a color image formed on an original 30 and to form the color image by overlapping colors onto an image forming body based on the image information. The image forming apparatus can be a color printer, facsimile, the multi function peripheral thereof and the like as well as the color copier 100.

The color copier 100 comprises a copier main body 101. An image input section for color 11 and an ADF (automatic document feeder) 40 are installed on an upper part of the copier main body 101. The ADF 40 operates to feed one or plural original 30 automatically in an ADF mode. The ADF mode is an operation to feed the original 30 mounted on the ADF 40 automatically so as to read an image of the original automatically.

The ADF 40 comprises an original mount 41, a roller 42a, a roller 42b, a roller 43, a carrying roller 44 and an eject tray 46. One or plural original 30 is mounted on the original mount 41. The roller 42a and roller 42b are provided at a downstream side of the original mount 41. When the ADF mode is selected, the original 30 paid out from the original mount 41 is carried by the roller 43 provided at a downstream side so as to make a U-shaped turn. When the ADF mode is selected, the original 30 is mounted so that the recording side thereof is mounted upwardly on the original mount 41.

The image input section 11 operates to read a color image formed on the original 30. For the image input section 11, for example, a slit-scan type color scanner is used. The image input section comprises an Image sensors 58 arranged in array. For example, when the original 30 performs the U-shaped turn with the roller 43 in the ADF mode, the image sensors 58 reads a surface of the original 30 and outputs an image reading signal SOUT. For the image sensors 58, for example, a three-line color CCD (charge coupled device) imaging device is used.

In the image sensor 58, three reading sensors for reading red (R), green (G) and blue (B) lights respectively, in each of which a plurality of light receiving elements are arranged in line in the main scanning direction, divide respective lights into pixels at different positions each other in the sub scanning direction perpendicular to the main scanning direction, so as to read light information of R, G and B simultaneously.

The original 30 which has been read in the image input section 11 is carried with the carrying roller 44 so as to be ejected to the eject tray 46. In a platen mode, the image sensor 58 outputs an image reading signal of an RGB color system obtained by reading the original 30. The platen mode is an operation to read an original image automatically by scanning the original 30 mounted on the platen glass with an optical driving system.

The image input section 11 comprises a first platen glass 51, a second platen glass 52 (ADF glass), a light source 53, mirrors 54, 55 and 56, an imaging optical unit 57 and an optical driving unit (not shown), as well as the image sensor 58. The light source 53 emits light to the original 30. The optical driving unit shifts the original 30 or image sensor 58 so as to shift them relatively by each other in the sub scanning direction. The sub scanning direction designates a direction perpendicular to the main scanning direction, where the main scanning direction is an arranged direction of the plural light receiving elements constituting the image sensor 58. As above, the above-described rollers 42a, 42b, 43 and carrying roller 44 carry the document 30 mounted on the original mount 41 of the ADF 40. An optical system of the image input section 11 scans and exposes an image on one or both side of the original 30, and the image sensor 58 reads an entered light which corresponds to the read image.

The image sensor 58 performs a photoelectric conversion according to a light amount of the entered light. An image processing section 31 is connected to the image sensor 58 through a control section 15. An analogue image reading signal generated by the photoelectric conversion is subjected to analogue processing, an A/D conversion, shading correction, image compressing processing, zoom processing and the like on the image processing section 31 so as to be a digital image data of R, G and B components. The image processing section 31 converts the image data into image data Dy, Dm, Dc and Dk for the colors of Y, M, C and BK based on a three-dimensional color information conversion table. The image data Dy, Dm, Dc and Dy generated by the color conversion are transferred to writing units 3Y, 3M, 3C and 3K constituting an image forming section 60.

The copier main body 101 is a so-called tandem type color image forming apparatus. The image forming section 60 is provided to the copier main body 101. The image forming section 60 forms a color image based on the image data Dy, Dm, Dc and Dk which the image input section 11 has read and obtained. The image forming section 60 comprises a plurality of image forming units 10Y, 10M, 10C and 10K each including an image forming body of each color, an intermediate transfer body 6 having an endless shape, and a fixing apparatus 17 to fix a toner image transferred from the intermediate transfer body 6 to a recording medium.

The image forming unit 10Y to form a yellow (Y) color image comprises a photoconductor drum 1Y as an image forming body to form a Y color toner image, a charging unit 2Y disposed around the photoconductor drum 1Y, a writing unit 3Y, a developing unit 4Y and a cleaning unit 8Y for the image forming body. The image forming unit 10M to form a magenta (M) color image comprises a photoconductor drum 1M as an image forming body to form an M color toner image, a charging unit 2M for M color, a writing unit 3M, a developing unit 4M and a cleaning unit 8M for the image forming body.

The image forming unit 10C to form a cyan (C) color image comprises a photoconductor drum 1C as an image forming body to form a C color toner image, a charging unit 2C for C color, a writing unit 3C, a developing unit 4C and a cleaning unit 8C for the image forming body. The image forming unit 10K to form a black (BK) color image comprises a photoconductor drum 1K as an image forming body to form a K color toner image, a charging unit 2K for K color, a writing unit 3K, a developing unit 4K and a cleaning unit 8K for the image forming body.

The charging unit 2Y and writing unit 3Y, the charging unit 2M and writing unit 3M, the charging unit 2C and writing unit 3C, and the charging unit 2K and writing unit 3K form an electrostatic latent image on the intermediate transfer body. The writing unit 3Y, 3M, 3C and 3K are writing units of a solid operation type in which a plurality of light modulation elements are disposed in line in the main scanning direction perpendicular to the carrying direction of the recording medium (sub scanning direction). In the present embodiment, a LED array head optical system is employed in which LED elements are used as the light modulation elements. The developing units 4Y, 4M, 4C and 4K performs a reversal development of applying a developing bias which is a direct voltage of the same polarity as that of the used toner (for example, negative polarity) overlapped with an alternating voltage. The intermediate transfer body 6 is winded around a plurality of rollers and supported rotatably, and transfers toner images of Y, M, C and BK colors formed on the respective photoconductor drums 1Y, 1M, 1C and 1K.

Here, the image forming process is summarized. The images of respective colors formed in the image forming units 10Y, 10M, 10C and 10K are transferred on the rotating intermediate transfer body 6 sequentially with primary transfer rollers 7Y, 7M, 7C and 7K to which a primary bias having polarity opposite to the used toner (for example, positive polarity) is applied, so that a color image (color toner image) where the colors are overlapped and merged is formed (primary transfer).

Below the image forming section 60, sheet feeding trays 20A, 20B and 20C to house a recording medium to be carried to the image forming section 60 are provided. The recording medium P housed in the sheet feeding tray 20A or the like is fed by a delivering roller 21 and a feeding roller 22A provided to the sheet feeding tray 20A and the like, passes through carrying rollers 22B, 22C, 22D registration roller 23 and the like, and carried to the secondary transfer roller 7A. The color image is transferred from the intermediate transfer body 6 to one side (front side) of the recording medium P all at once (secondary transfer).

The recording medium P to which a color image has been transferred is subjected to fixing processing in the fixing apparatus 17, and is ejected onto the sheet eject tray 25 with being pinched with sheet eject rollers 24. The residual toners after the transfer left on round surfaces of the photoconductor drums 1Y, 1M, 1C and 1K are removed with the cleaning units 8Y, 8M, 8C and 8K, and the process advances to the next image forming cycle.

In a double-sided image formation, after the image formation on one side (front side), the recording medium P ejected from the fixing apparatus 17 is deviated from the sheet ejecting path with a branching section 26. Subsequently, the recoding medium P passes through a circulating sheet path 27A located below, is reversed in its front/back side by a reversing carrying path 27B which is a tray-less duplex unit (ADU), passes through a re-sheet feeding section 27C, and joins to the above-described transfer path.

The composition to carry the recording medium P comprises a sensor 23A such as a transmission-type photo sensor which measures lengths between both ends in the main scanning direction and sub scanning direction of the recording medium P and outputs it to the control section 15 when it passes through the registration roller 23. The control section 15 compares the size of the recording medium P output from the sensor 23A with a size of the recording medium P previously set with respect to each of the sheet eject trays 20A, 20B and 20C, so as to detect the size change caused by in the image formation on the front side due to heat shrinkage or the like. The control section 15 sets a minute zoom rate and rotation angle of the image to be formed on the backside, according to the size change. For example, at the carrying on the registration roller 23, the size of the recoding medium P during the image formation on the front side and the size of the recording medium P during the image formation on the backside are respectively detected, and the detected results are compared with each other to set the configuration of the image to be formed on the backside.

The reversed recording medium P is carried to the secondary transfer roller 7A again through the registration roller 23, and the color image (color toner image) is transferred onto the other side (backside) of the recording medium P all at once. After the secondary transfer roller 7A transfers the color image onto the recording medium P, the cleaning section 8A for the intermediate transfer belt removes a residual toner from the intermediate transfer body 6 from which the recording medium P has been separated by self stripping.

As for the recording medium P to which these image formations are performed, a thin paper of about 52.3 to 63.9 kg/m$^2$ (1,000 sheets), normal paper of about 64.0 to 81.4 kg/m$^2$ (1,000 sheets), thick paper of about 83.0 to 130.0 kg/m$^2$ (1,000 sheets) and ultra thick paper of about 150.0 kg/m$^2$ (1,000 sheets) can be given. As for the thickness of the recording medium P (paper thickness), around 0.05 to 0.15 mm can be given.

Figure 2:
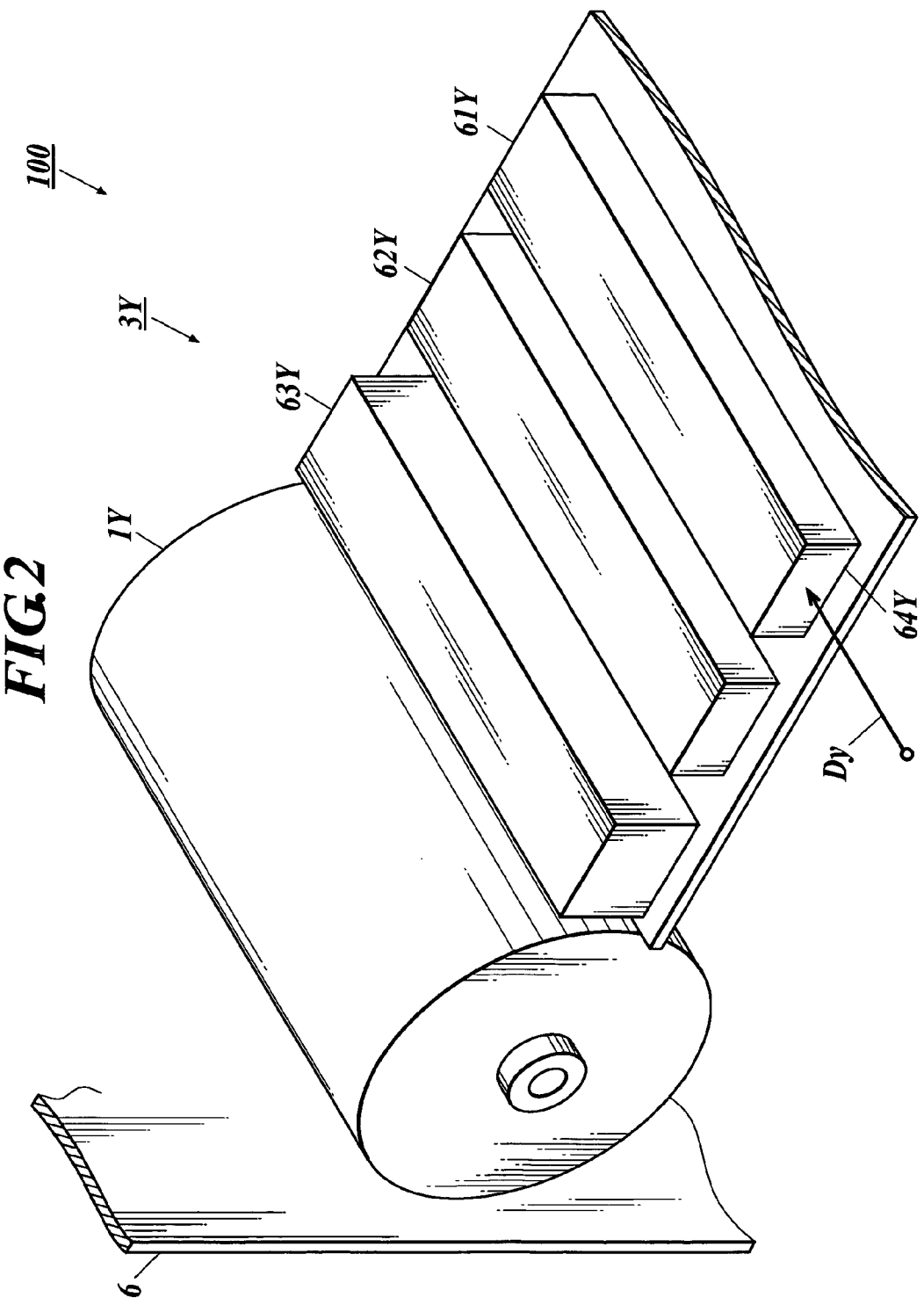
FIG. 2 is a perspective view showing an example of a writing unit 3Y and the peripheral circuits thereof.

Next, peripheral structures of the image forming unit to form an image is described with reference to the peripheral of the writing unit 3Y as an example. As shown in FIG. 2, the writing unit 3Y is provided to face to the photoconductor drum 1Y. The writing unit 3Y comprises an IC implemented base board 64Y. A resister array 61Y assembled to be a semiconductor integrated circuit (IC), a latch circuit 62Y and an LED head 63Y are implemented to the IC implemented base board 64Y, and they are connected to each other with a printed wiring (not shown) and the like. As for the writing unit 3Y and the like, for example, an LED array head optical unit, in which light emitting elements (LED) of 7,500 pixels are arranged in line in the main scanning direction at the resolution of 600 dpi for the A4 size, is used. In the LED array head optical unit, the LEDs emits all at once in various intensities based on the image data of one line, so as to form an LED light column for forming Y color line of the one line.

The LED light column for Y color exposes one line of the photoconductor drum 1Y all at once, so as to form a linear electrostatic latent image in the main scanning direction. The developing unit 4Y shown in FIG. 1 develops a linear electrostatic latent image formed on the photoconductor drum 1Y with a Y color toner. The Y color toner image developed by the developing unit 4Y is transferred to the intermediate transfer body 6.

Figure 3:
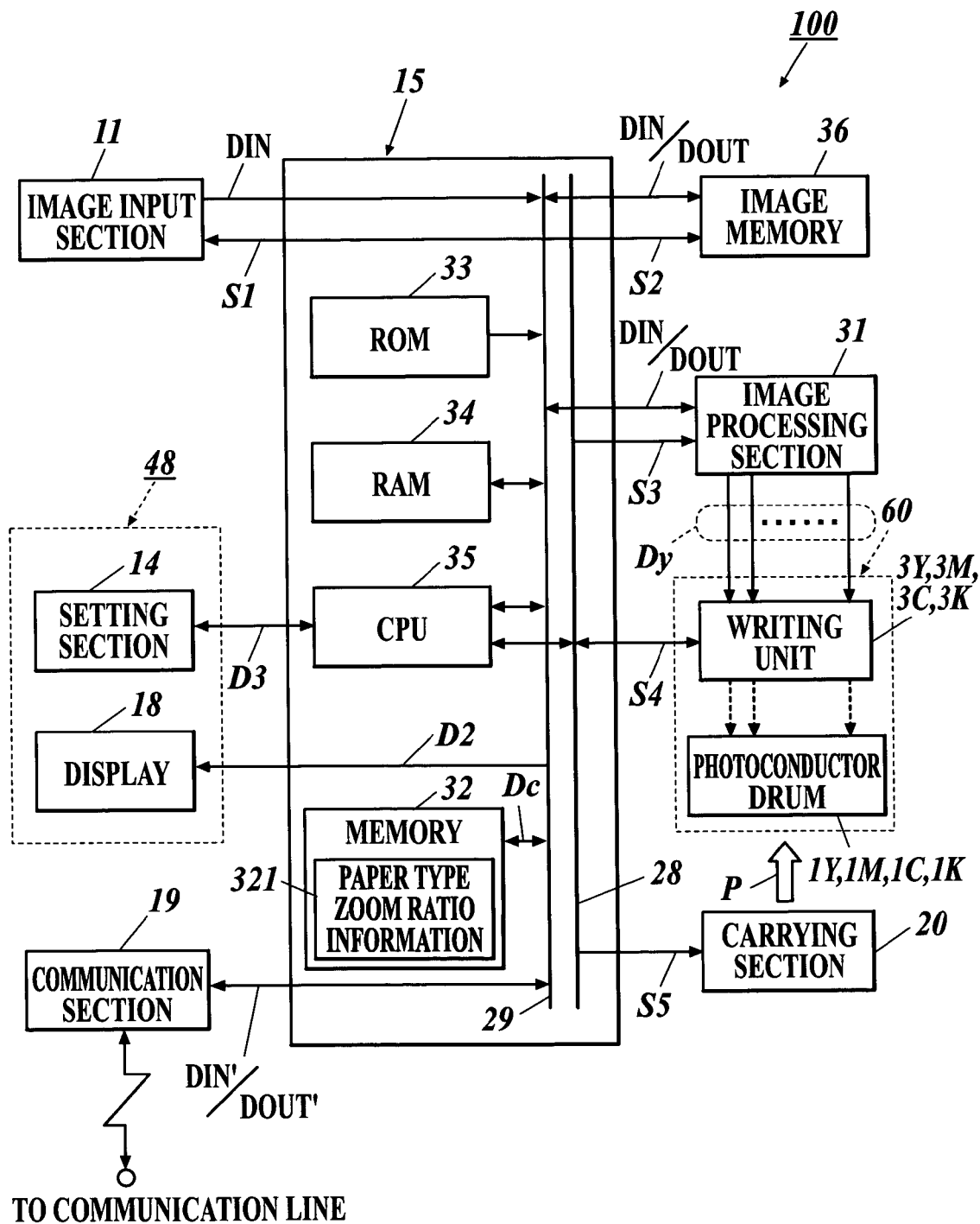
FIG. 3 is a block diagram schematically showing a composition of a control system of the color copier 100.

Next, a control system of the color copier 100 is described. As shown in FIG. 3, the color copier 100 comprises the image input section 11, the control section 15, a communication section 19, a carrying section 20, the image processing section 31, an image memory 36, an operation panel 48 and the image forming section 60.

The control section 15 comprises a ROM 33 (read only memory), a CPU 35 (central processing unit), and a RAM 34 (random access memory) as a working area. A system program data to control the whole copier is stored in the ROM 33. The ROM 33 stores configuration information inherent in the apparatus such as the number of the pixels in the main/sub scanning directions (lines) which the image forming section 60 forms on the recording medium P, a program data which is executable for the control unit 15, and the like. The RAM 34 provides a temporary storage of a control command in executing the double-sided mode, and a storage area as a working area in the operation processing described below. The CPU 35 read out the system program data from the ROM 33 when a power is turned on, and controls the whole copier.

The operation panel 48 comprises a setting section 14 composed of a touch panel and a display 18 such as a liquid crystal display elements (LCD) or the like, and displays an operation screen and accepts an input of a configuration under a control of the control membersection 15. The setting section 14 is connected to the above-described control section 15, and accepts an operation to input a paper type and image forming condition to single one or both sides of the recording medium P on which the image forming section 60 forms an image. Also, the setting section 14 accepts an input of a minute zoom ratio (a fine magnification ratio), displacement and the like to set an aspect of an image to be formed on the front side or backside. The setting section 14 accepts an operation to input configuration of image density, paper size, number of copies and the like.

The configuration input on the operation panel 48 is temporary stored in a working area of the RAM 34 under control of the control section 15, and is saved by updating paper type zoom ratio information 321 in the memory 32 described below according to an input to confirm the configuration.

In the present embodiment, a system such as a control bus 28 and data bus 29 is connected to the above CPU 35. The display 18 is connected to the data bus 29. The display 18 displays a preview of the original 30 in a reduced size based on the image data DIN obtained by the image input section 11, and selection items for image forming conditions based on a display data D2 transmitted from the CPU 35. The image forming condition and selection information of sheet feeding cassette set on the operation panel 48 are output to the CPU 35 as an operation data D3.

The memory 32 is connected to the CPU 35 through the control bus 28 and data bus 29. The memory 32 stores the paper type zoom information 321 such as a table data which stores the configuration set on the operation panel 48 with respect to each configuration item.

The image input section 11 is connected to the control bus 28 and data bus 29. An analogue/digital converter (not shown) is provided to the image input section 11. The image input section 11 performs an A/D conversion to an analogue image reading signal obtained by reading the original 30 based on a reading control signal S1. The digital image data DIN generated by the A/D conversion is transferred to the image memory 36 connected to the control bus 28 and data bus 29.

The image data DIN is stored in the image memory 36 based on a memory control signal S2. As for the image memory 36, a hard disk and semiconductor memory and the like can be given. The CPU outputs the reading control signal S1 to the image input section 11 through the control bus 28, and the memory control signal S2 to the image memory 36 similarly. The CPU 35 controls writing and reading of data at the image memory 36.

The image processing section 31 previously stores a three-dimensional color information conversion table in a memory (not shown), and converts the image data DOUT (Dr, Dg and Db) of a RGB color system read out from the image memory 36 to the image data Dy, Dm, Dc and Dk of a YMCK color system based on an image processing control signal S3.

The image processing section 31 supplies the image data Dy to the writing unit 3Y of the image forming section 60 in a line and a pixel basis. For the image processing section 31, a DSP (digital signal processor), a RAM and the like can be given. The RAM has a working area (a line buffer) to supply the image data Dy in a line and a pixel basis, and stores a line data subjected to the image processing temporary before the supply. Specifically, the RAM stores a plurality of line data each corresponding to an image formation of one line in a main scanning direction.

In the color copier 100, an image forming position in the main scanning direction is adjusted under control of the control section 15 by shifting the line data of the image processing section 31. Similarly in the color copier 100, an image forming position in the sub scanning direction is adjusted under control of the control section 15 by delaying or reading-ahead the line data.

The image forming section 60 is connected to the above control bus 28 and data bus 29. The image forming section 60 is composed of the image forming units 10Y, 10M, 10C and 10K as shown in FIG. 1. FIG. 3 shows only the image forming unit 10Y for Y color. The image forming unit 10Y constituting the image forming section 60 comprises the writing unit 3Y where a plurality of light emitting elements are arranged in line and the photoconductor drum 1Y to which an image is formed. The other image forming units 10M, 10C, 10K for M, C and BK colors respectively are similar to the image forming unit 10Y, thus the descriptions thereto are omitted. In the present embodiment, the CPU 35 outputs an imaging control signal S4 to the image forming section 60 through the control bus 28.

The writing unit 3Y for Y color of the image forming section 60, for example, forms under control of the control section 15 an toner image for Y color on the photoconductor drum 1Y according to the image data Dy for Y color in a line basis and an input of the imaging control signal S4. The writing unit 3Y generates an LED light array for one Y color line including various intensity of light all at once, based on the image data Dy of one line. The LED light array for Y color exposes one line of the photoconductor drum 1Y all at once, so as to form a linear electrostatic latent image. The linear electrostatic latent image formed on the photoconductor drum 1Y is developed by the developing unit 4Y shown in FIG. 1 with a Y color toner. The toner image for Y color developed by the developing unit 4Y is transferred to the intermediate transfer body 6.

A carrying section 20 is connected to the control bus 28, and the CPU 35 controls the sheet feeding trays 20A to 20C shown in FIG. 1 based on a sheet feeding control signal S5. For example, the carrying section 20 selects one of the sheet feeding trays 20A, 20B and 20 based on the sheet feeding control signal S5, and carries the recording medium P paid out from the sheet feeding tray 20A, 20B or 20C to the image forming section 60. The CPU 35 outputs the sheet feeding control signal S5 to the carrying section 20.

The communication section 19 is connected to the data bus 29. The communication section 19 is connected to a communication line such as a LAN (local area network), and is used for communication with an external computer, printer and the like. For example, in the case of outputting the original image read by the color copier 100 an external printer or the like to form an image, the communication section 19 transmits an image data DOUT' to the external printer. This communication function of the communication section 19 is also used when an image data DIN' is accepted from an external computer or the like and the image forming section 60 performs double-sided printing or the like under control of the control section 15.

Here, a configuration regarding image aspect to be formed on the front side or backside set on the operation panel 48 such as a minute zoom ratio and displacement is described. Setting the image aspect by the minute zoom ratio is to set an image forming zoom ratio of the main scanning direction at each image forming position in the sub scanning direction, and to set an image forming zoom ratio of the sub scanning direction at each image forming position in the main scanning direction. Further, setting the image aspect by the displacement is to set a displacement of the image forming position in the main scanning direction at each image forming position in the sub scanning direction, and to set a displacement of the image forming position in the sub scanning direction at each image forming position in the main scanning direction. The drawings referred to in the following description show a configuration to the front side, and a configuration to the backside is made similarly.

Figure 4A:
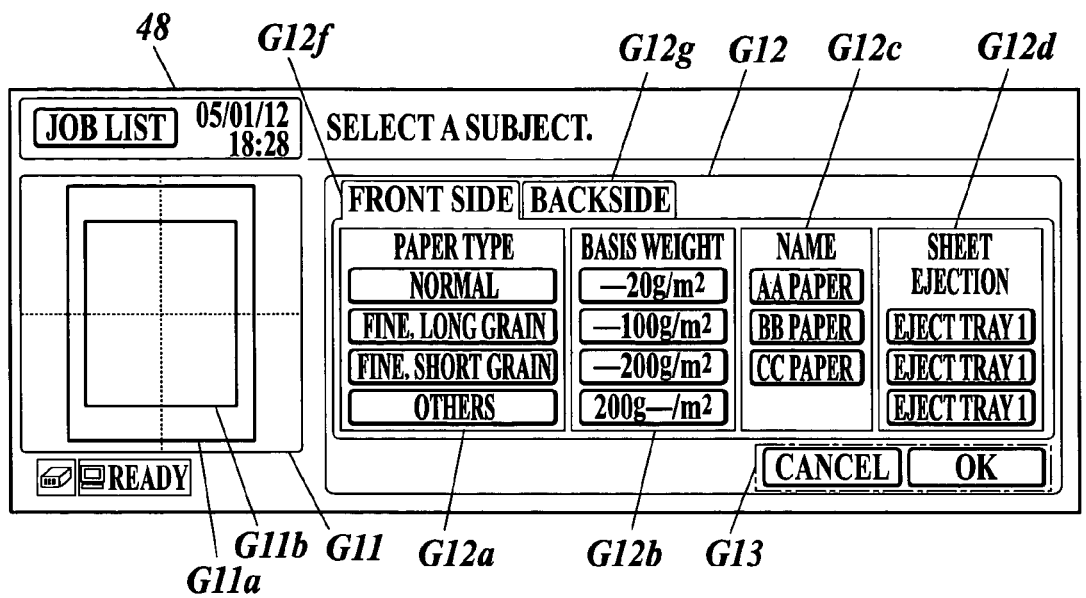
FIG. 4A is a schematic view showing an example of a configuration or selection of an image aspect to be formed on the front side or backside on an operation panel 48.

As shown in FIG. 4A, in setting the image aspect to be formed on the front side or backside, the operation panel 48 displays an image information display area G11, a configuration input area G12 and a confirmation input area G13 and the like. The image information display area G11 is to display a condition of image formation to a recording medium schematically. Specifically, it displays a recording medium image G11a to show a space of the recording medium and an image forming area image G11b to show an image forming area on the space.

The configuration input area G12 is to display a button to select paper type, basis weight, name, sheet ejection of the recording medium, to each of which an image aspect of an image to be formed on the front side or backside of a recording medium is set. The configuration input area G12 comprises a paper type input area G12a, a basis weight input area G12b, a name input area G12c, a sheet ejection input area G12d, a front side button G12f, a backside button G12g and the like.

The paper type input area G12a displays buttons such as "normal", "fine, long grain", "fine, short grain", "others" and the like to select a paper type. When one of the buttons is selected, for example, the selected button is highlighted and the input to set the paper type is accepted. The paper type may be based on a paper size such as "A4" and "A5", as well as the material.

The basis weight input area G12b displays buttons such as "to 20 g/m$^2$", "to 100 g/m$^2$", "to 200 g/m$^2$", "200 or more g/m$^2$" and the like to select a basis weight. When one of the buttons is selected, for example, the selected button is highlighted and the input to set the basis weight is accepted.

The name input area G12c displays buttons such as "AA paper", "BB paper", "CC paper" and the like to select a paper name. When one of the buttons is selected, for example, the selected button is highlighted and the input to set the name is accepted.

The sheet ejection input area G12d displays buttons such as "eject tray 1", "eject tray 2" "eject tray 3" and the like to select a sheet ejection tray. When one of the buttons is selected, for example, the selected button is highlighted and the input to set the sheet ejection tray is accepted. The front side button G12f is to designate the front side, and the backside input area G12g is to designate the backside.

The confirmation input area G13 displays buttons to reflect the configuration set on the screen on the paper type zoom ratio information 321, to clear the configuration temporary stored in the RAM by a selection on the screen, and the like.

A user inputs selections on a screen of the operation panel 48 shown in FIG. 4A, so that the user can set an image aspect with respect to each paper type, basis weight, name, sheet ejection.

Following to the selection on the screen shown in FIG. 4A, the operation panel 48 displays a screen to set details of the image aspect to be formed in the selected condition. That is, the operation panel 48 displays a screen to set values such as an image forming zoom ratio of the main scanning direction at each image forming position in the sub scanning direction, image forming zoom ratio of the sub scanning direction at each image forming position in the main scanning direction, displacement of an image forming position in the main scanning direction at each image forming position in the sub scanning direction, and displacement of an image forming position in the sub scanning direction at each image forming position in the main scanning direction. Specifically, when the "normal" is selected as the paper type, the operation panel 48 displays configuration input buttons B1 to B4 to set the above four conditions, as shown in FIG. 4B.

Figure 4B:
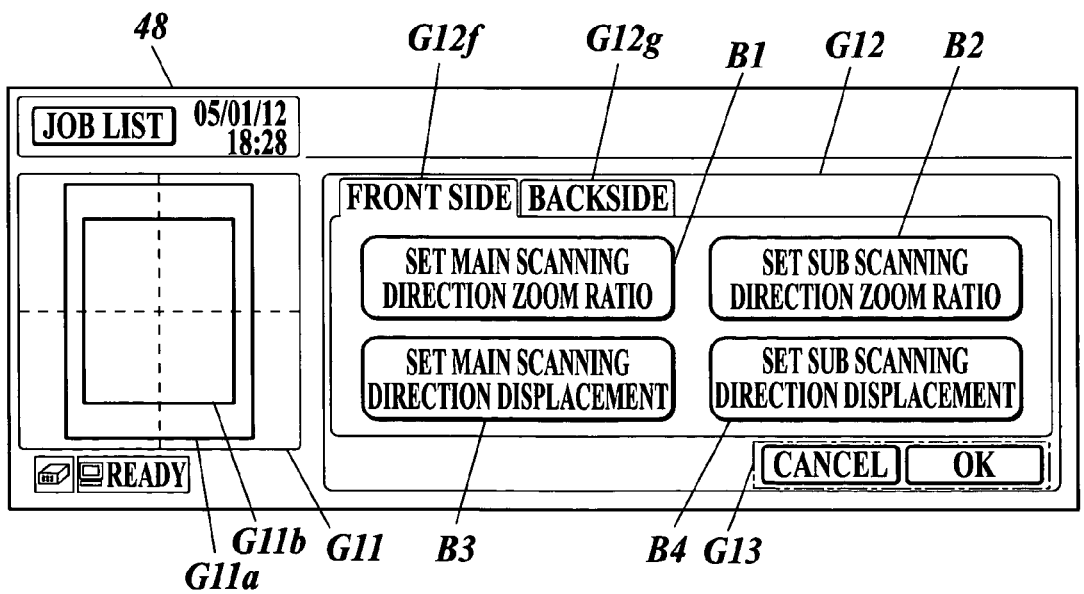
FIG. 4B is a schematic view showing an example of the configuration of an image aspect on the operation panel 48 in case of a normal paper.
Figure 5A:
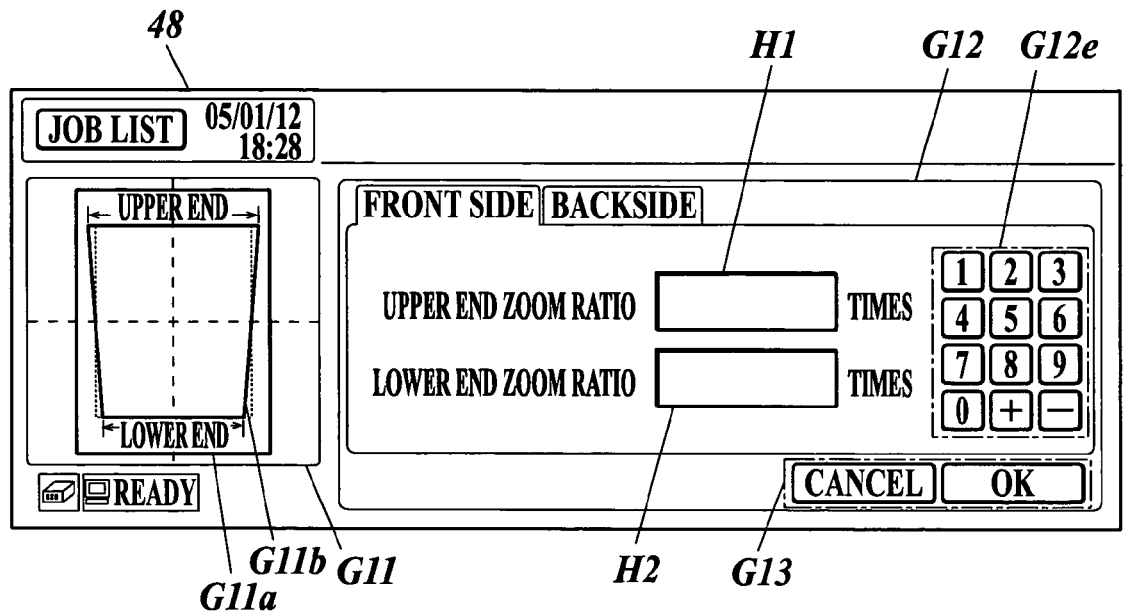
FIG. 5A is a schematic view showing an example of a configuration on the operation panel 48 regarding an image forming zoom ratio of a main scanning direction.
Figure 5B:
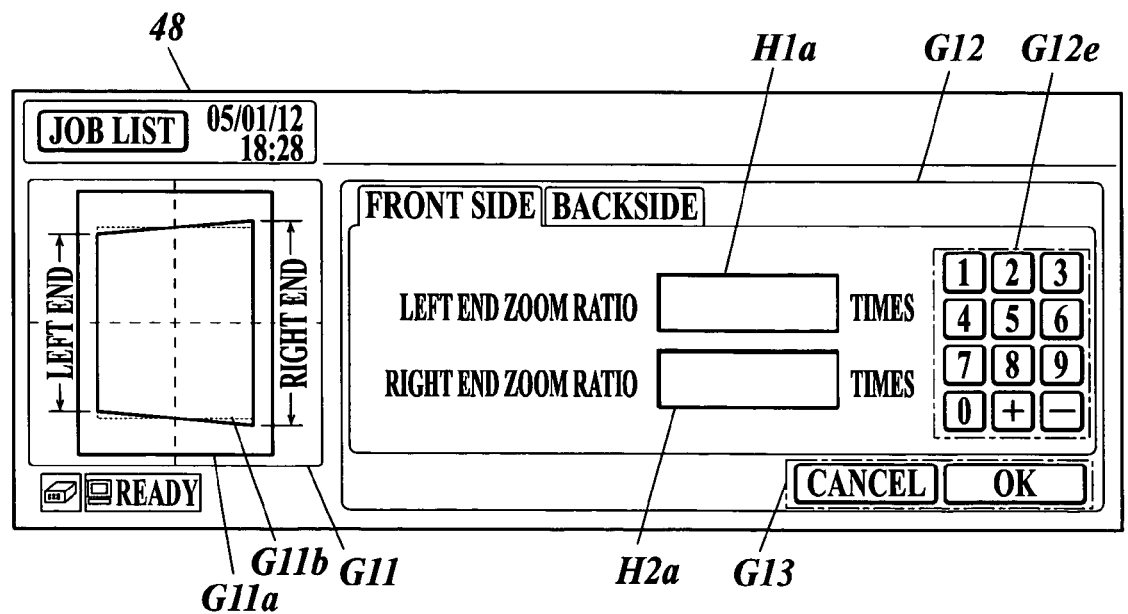
FIG. 5B is a schematic view showing an example of a configuration on the operation panel 48 regarding an image forming zoom ratio of a sub scanning direction.

When the image forming zoom ratio of the main scanning direction at each image forming position in the sub scanning direction is set (i.e. when the configuration input button B1 in FIG. 4B is selected), the configuration input area G12 on the operation panel 48 displays an upper end zoom ratio H1 for an upper end of an image forming area, a lower end zoom ratio H2 for the lower end, and a numeral input button G12e to input the numeral values thereof which is an image imitating a numeric keypad or the like, as shown in FIG. 5A. A user can set the upper end zoom ratio H1 and lower end zoom ratio H2 by inputting a numeral value with the numeral value input button G12e or the like, and can allow the configuration to be reflected on the paper type zoom ratio information 321 by the confirmation input area G13.

When the image forming zoom ratio of the sub scanning direction at each image forming position in the main scanning direction is set (i.e. when the configuration input button B2 in FIG. 4B is selected), the configuration input area G12 on the operation panel 48 displays an right end zoom ratio H1a for a right end of an image forming area, a left end zoom ratio H2a for the left end, and the numeral input button G12e. A user can set the right end zoom ratio H1a and left end zoom ratio H2a by inputting a numeral value with the numeral value input button G12e or the like, and can allow the configuration to be reflected on the paper type zoom ratio information 321 by the confirmation input area G13.

Figure 6A:
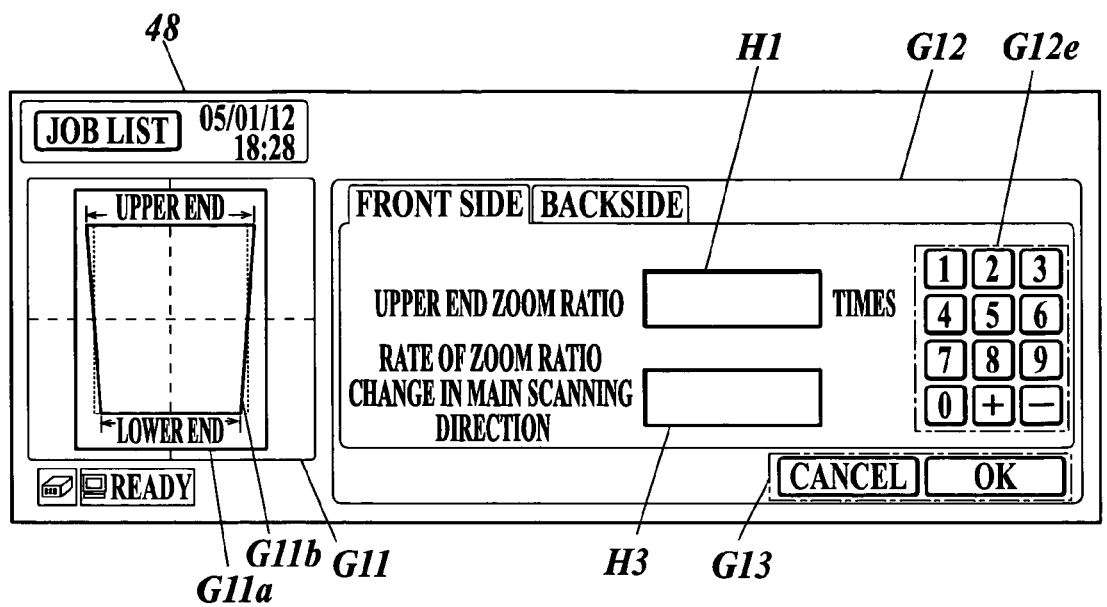
FIG. 6A is a schematic view showing an example of a configuration on the operation panel 48 regarding an image forming zoom ratio of a main scanning direction.
Figure 6B:
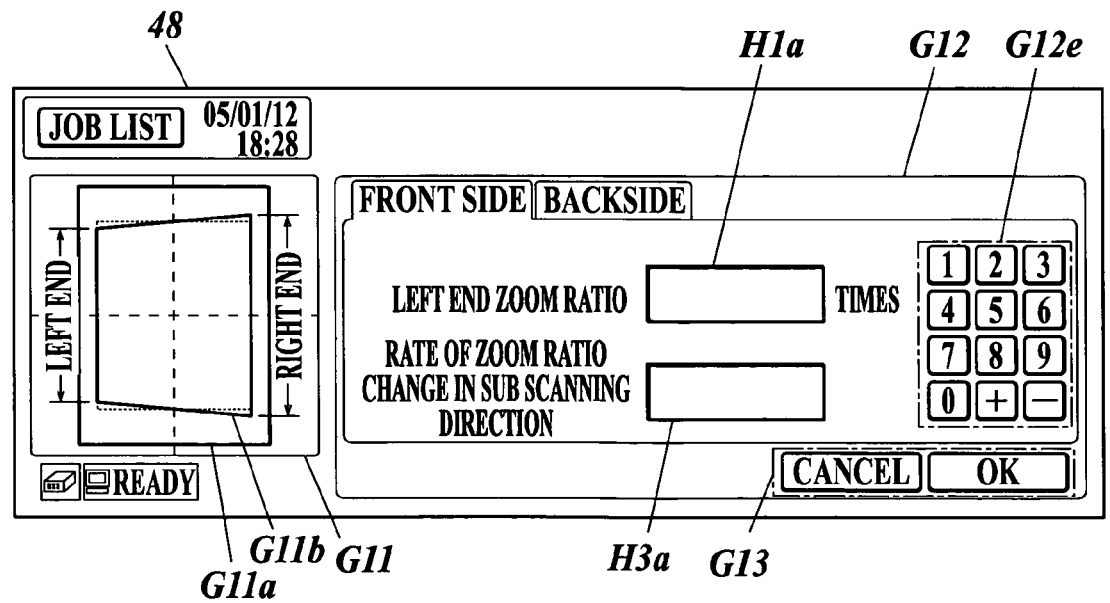
FIG. 6B is a schematic view showing an example of a configuration on the operation panel 48 regarding an image forming zoom ratio of a sub scanning direction.
Figure 7A:
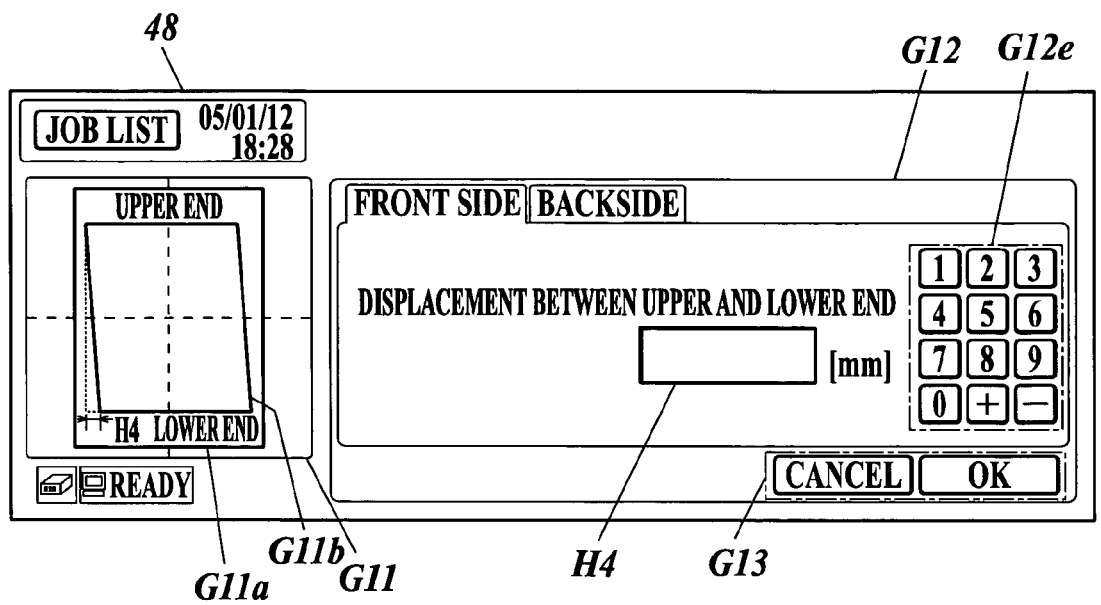
FIG. 7A is a schematic view showing an example of a configuration on the operation panel 48 regarding displacement of a position of image formation in a main scanning direction.
Figure 7B:
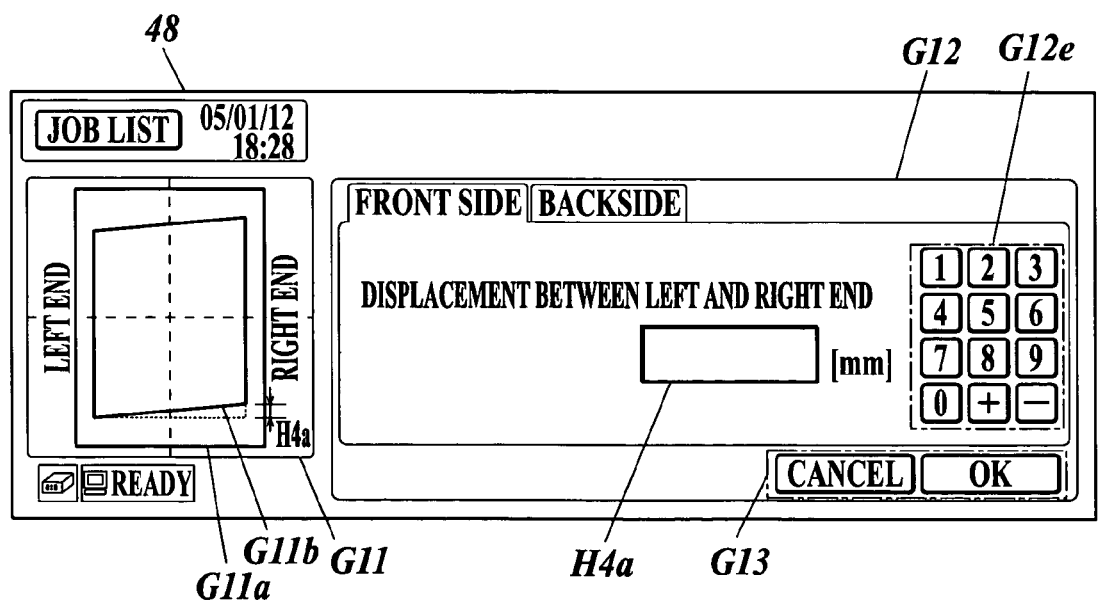
FIG. 7B is a schematic view showing an example of a configuration on operation panel 48 regarding displacement of a position of image formation in a sub scanning direction.

As shown in FIG. 6A, the image forming zoom ratio of the main scanning direction at each image forming position in the sub scanning direction may be set as the upper end zoom ratio H1 for an upper end of an image forming area and a rate of zoom ratio change H3 which is a rate of change of the zoom ratio in the main scanning direction per unit length of the sub scanning direction. Similarly as shown in FIG. 6B, the image forming zoom ratio of the sub scanning direction at each image forming position in the main scanning direction may be set with the right end zoom ratio H1a for a right end of an image forming area and a rate of zoom ratio change H3a which is a rate of change of the zoom ratio in the sub scanning direction per unit length of the main scanning direction.

When the displacement of an image forming position in the main scanning direction at each image forming position in the sub scanning direction is set (i.e. when the configuration input button B3 in FIG. 4B is selected), the configuration input area G12 on the operation panel 48 displays a shift amount H4 which is the displacement between upper and lower ends of the image forming area, and the numeral input button G12e. A user can set the shifting amount H4 by inputting a numeral value with the numeral value input button G12e or the like, and can allow the configuration to be reflected on the paper type zoom ratio information 321 by the confirmation input area G13.

When the displacement of an image forming position in the main scanning direction at each image forming position in the sub scanning direction is set (i.e. when the configuration input button B4 in FIG. 4B is selected), the configuration input area G12 on the operation panel 48 displays a shift amount H4a which is a displacement between left and right ends of the image forming area, and the numeral input button G12e. A user can set the shifting amount H4a by inputting a numeral value with the numeral value input button G12e or the like, and can allow the configuration to be reflected on the paper type zoom ratio information 321 by the confirmation input area G13.

Figure 8:
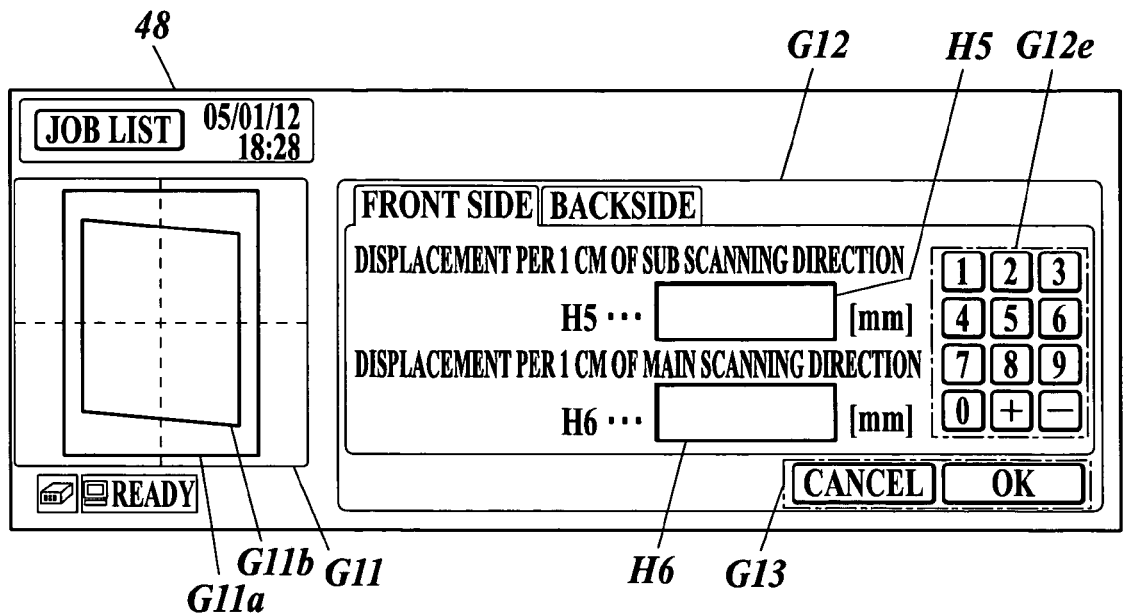
FIG. 8 is a schematic view showing an example of a configuration on the operation panel 48 regarding displacement of a position of image formation in main/sub scanning directions.

As shown in FIG. 8, the above two displacements may be set as a unit shift amount H5 which is a displacement of an image forming position in the main scanning direction per a unit length (1 cm) of the sub scanning direction, and a unit shift amount H6 which is a displacement of an image forming position in the sub scanning direction per a unit length (1 cm) of the main scanning direction.

Figure 9A:
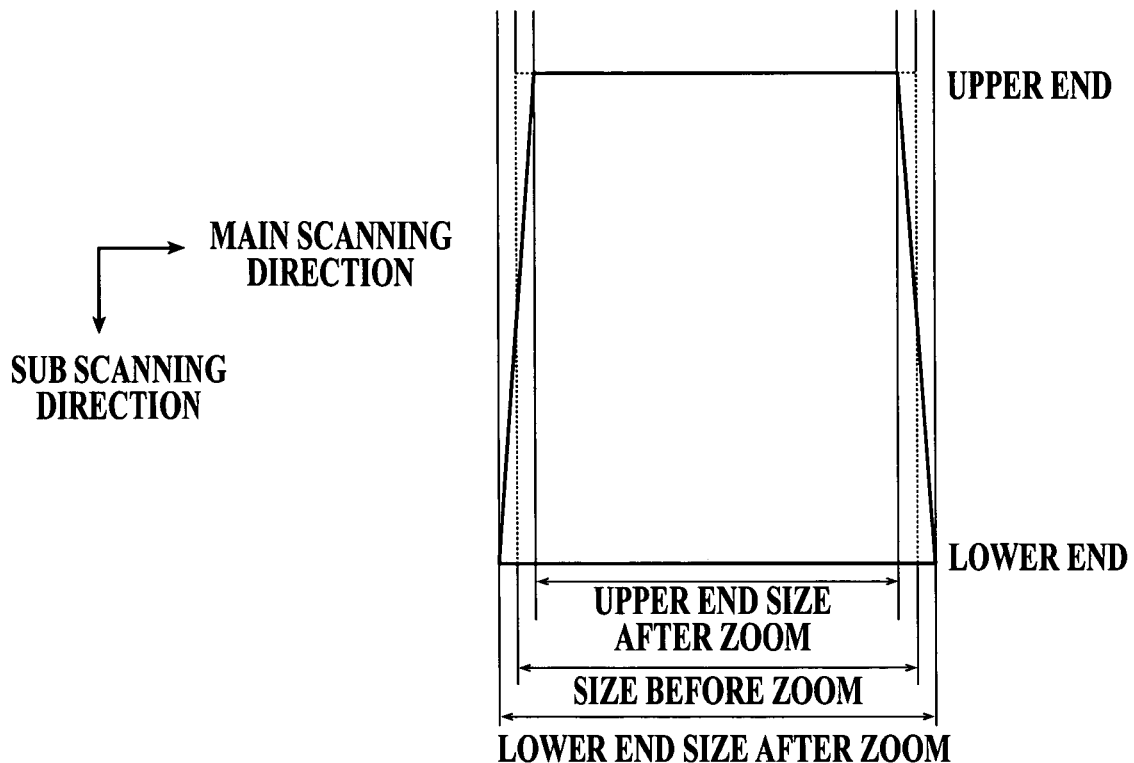
FIG. 9A is a conceptual view showing an example of a recording medium P which has been deformed into a trapezoid.

In the color copier 100, since the image aspect to be formed on the front side or backside is set as the image forming zoom ratio of the main scanning direction at each image forming position in the sub scanning direction according to the above setting on the operation panel 48, the image forming area can be adjusted to be corresponding to a trapezoidal recording medium P which has different lengths between the upper and lower ends in the sub scanning direction compared to the normal condition as shown in FIG. 9A.

Figure 9B:
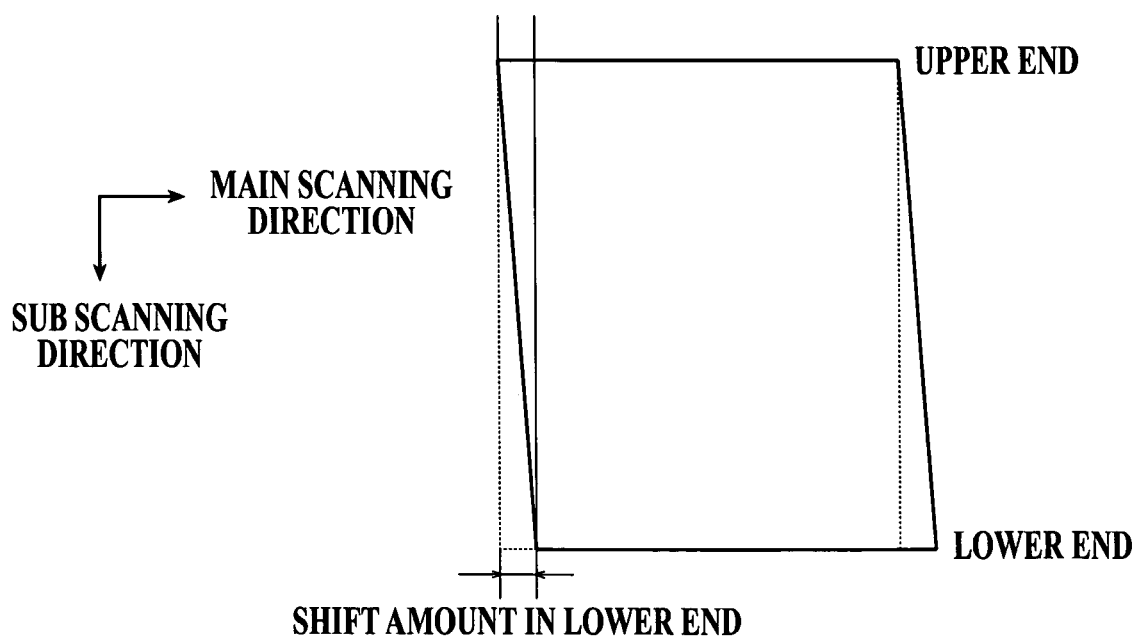
FIG. 9B is a conceptual view showing an example of a recording medium P which has been deformed into a parallelogram.

Further in the color copier 100, since the image aspect to be formed on the front side or backside is set as the displacement of the image forming position in the main scanning direction at each image forming position in the sub scanning direction, the image forming area can be adjusted to be corresponding to a parallelogram recording medium P in which the upper and lower ends are disagreed in position of the main scanning direction compared to the normal condition as shown in FIG. 9B.

Figure 10A:
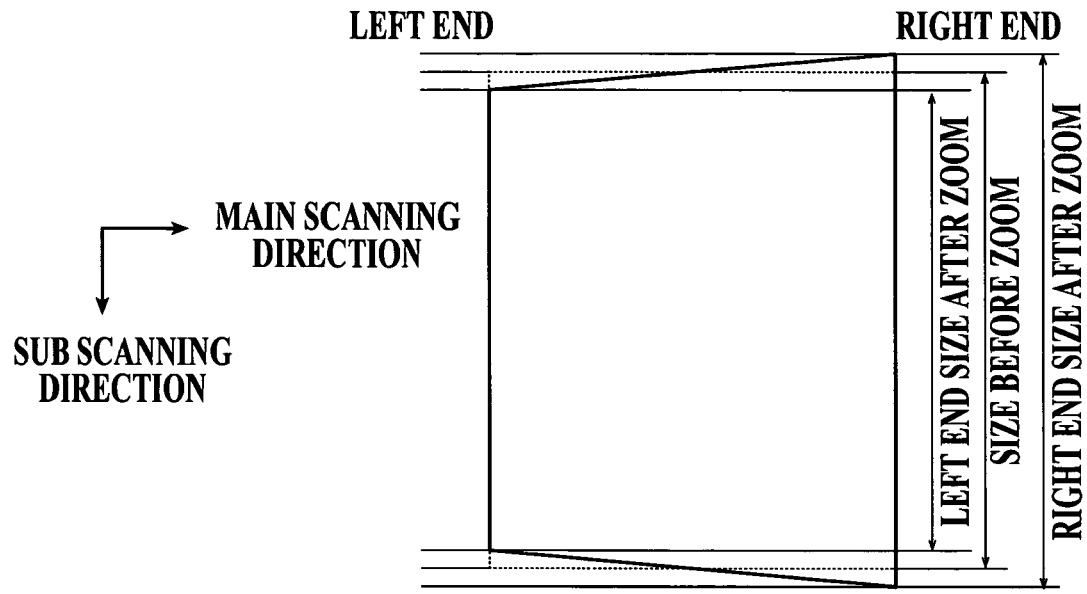
FIG. 10A is a conceptual view showing an example of a recording medium P which has been deformed into a trapezoid.

Further in the color copier 100, since the image aspect to be formed on the front side or backside is set as the image forming zoom ratio of the sub scanning direction at each image forming position in the main scanning direction, the image forming area can be adjusted to be corresponding to a trapezoidal recording medium P which has different lengths between the left and right ends in the main scanning direction compared to the normal condition as shown in FIG. 10A.

Figure 10B:
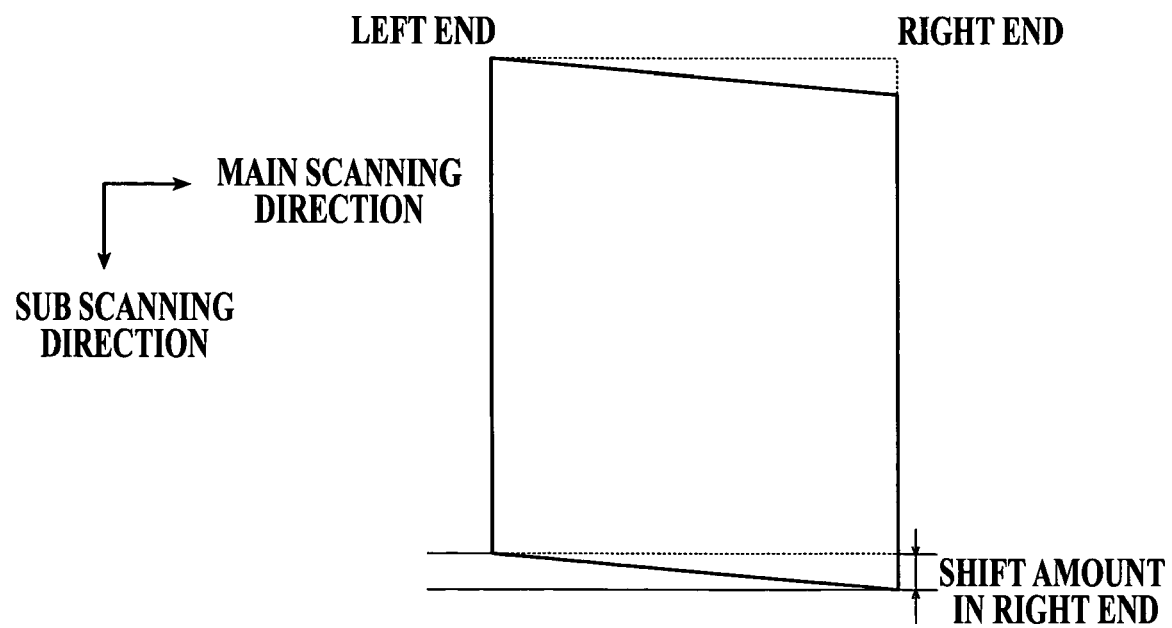
FIG. 10B is a conceptual view showing an example of a recording medium P which has been deformed into a parallelogram.

Further in the color copier 100, since the image aspect to be formed on the front side and backside is set as the displacement of the image forming position in the sub scanning direction at each image forming position in the main scanning direction, the image forming area can be adjusted to be corresponding to a parallelogram recording medium P in which the left and right ends are disagreed in position of the sub scanning direction compared to the normal condition as shown in FIG. 10B.

Figure 11:
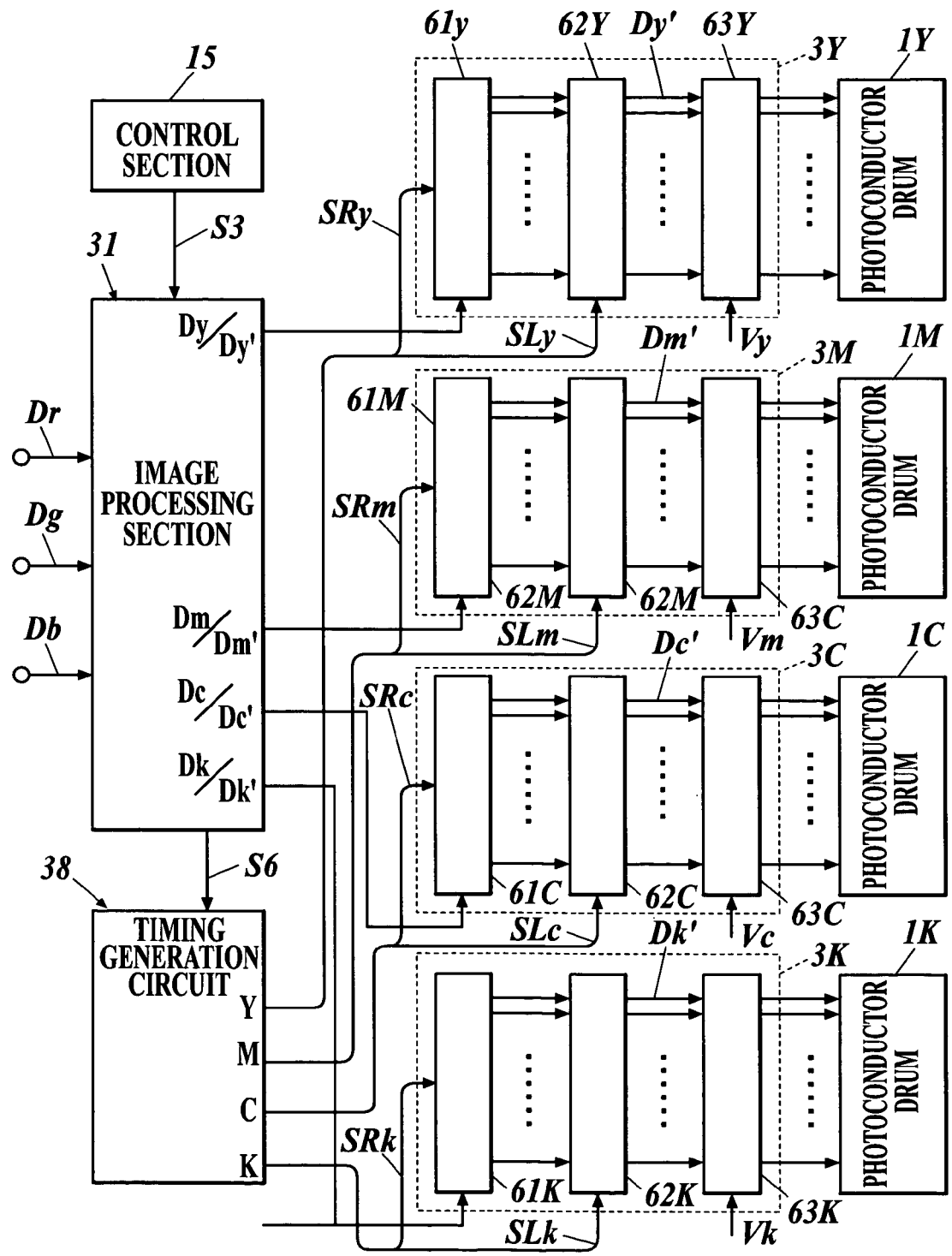
FIG. 11 is a block diagram showing an example of writing units for each color of Y, M, C and BK and peripheral circuits thereof.

Next, the LED writing units and the peripheral circuits thereof for Y, M, C and BK colors respectively are described. As shown in FIG. 11, the image processing section 31 is connected to the CPU 35. The CPU 35 outputs the image processing control signal S3 to the image processing section 31. The image processing section 31 converts the digital image data DIN (Dr, Dg and Db) corresponding to R, G and B color components into a writing data for LED writing, based on the image processing control signal S3. For example, the image data DIN is converted into the image data Dy, Dm, Dc and Dk for Y, M, C and BK colors respectively based on the three dimensional color information conversion table.

In this embodiment, the image processing section 31 supplies the image data Dy to the resister array 61Y of the writing unit 3Y in a line and a pixel basis. Similarly, the image data Dm is supplied to the resister array 61M of the writing unit 3M in a line and a pixel basis. Similarly, the image data Dc is supplied to the resister array 61C of the writing unit 3C in a line and a pixel basis. Similarly, the image data Dk is supplied to the resister array 61K of the writing unit 3K in a line and a pixel basis.

The timing generation circuit 38 is connected to the image processing section 31. The image processing section 31 outputs a timing generation control signal S6 to the timing generation circuit 38. The timing generation circuit 38 generates a resister control signal SRy and a latch control signal SLy for Y color, a resister control signal SRm and a latch control signal SLm for M color, a resister control signal SRc and a latch control signal SLc for C color, and a resister control signal SRk and a latch control signal SLk for K color.

The writing units 3Y, 3M, 3C and 3K for Y, M, C and BK colors respectively are connected to the image processing section 31 and timing generation circuit 38. The writing unit 3Y comprises the resister array 61Y, latch circuit 62Y and LED head 63Y. A resister array 61Y is connected to the image processing section 31, and accepts the one line serial image data Dy sequentially and holds the input image data Dy according to the resister control signal SRy.

The latch circuit 62Y is connected to the resister array 61Y, and latches the image data Dy output from the resister array 61Y in parallel according to the latch control signal SLy. The LED head 63Y is connected to the latch circuit 62Y. The LED head 63Y is connected to the laser driving power source Vy. The LED head 63Y generates an LED light array for one Y color line including various intensity of light all at once, based on the one line image data Dy.

The LED light array for Y color exposes one line of the photoconductor drum 1Y all at once, so as to form a linear electrostatic latent image. The linear electrostatic latent image formed on the photoconductor drum 1Y is developed by the developing unit 4Y shown in FIG. 1 with a Y color toner. The toner image for Y color developed by the developing unit 4Y is transferred to the intermediate transfer body 6.

The writing unit 3M comprises the resister array 61M, latch circuit 62M and LED head 63M. A resister array 61M is connected to the image processing section 31, and accepts the one line serial image data Dm sequentially and hold the input image data Dm according to the resister control signal SRm.

The latch circuit 62M is connected to the resister array 61M, and latches the image data Dm output from the resister array 61M in parallel according to the latch control signal SLm. The LED head 63M is connected to the latch circuit 62M. The LED head 63M is connected to the laser driving power source Vm. The LED head 63M generates an LED light array for one M color line including various intensity of light all at once, based on the image data Dm of one line.

The LED light array for M color exposes one line of the photoconductor drum 1M all at once, so as to form a linear electrostatic latent image. The linear electrostatic latent image formed on the photoconductor drum 1M is developed by the developing unit 4M shown in FIG. 1 with an M color toner. The toner image for M color developed by the developing unit 4M is transferred to the intermediate transfer body 6.

The writing unit 3C comprises the resister array 61C, latch circuit 62C and LED head 63C. A resister array 61C is connected to the image processing section 31, and accepts the one line serial image data Dc sequentially and holds the input image data Dc according to the resister control signal SRc.

The latch circuit 62C is connected to the resister array 61C, and latches the image data Dc output from the resister array 61C in parallel according to the latch control signal SLc. The LED head 63C is connected to the latch circuit 62C. The LED head 63C is connected to the laser driving power source Vc. The LED head 63C generates an LED light array for one C color line including various intensity of light all at once, based on the image data Dc of one line.

The LED light array for C color exposes one line of the photoconductor drum 1C all at once, so as to form a linear electrostatic latent image. The linear electrostatic latent image formed on the photoconductor drum 1C is developed by the developing unit 4C shown in FIG. 1 with an C color toner. The toner image for C color developed by the developing unit 4C is transferred to the intermediate transfer body 6.

The writing unit 3K comprises the resister array 61K, latch circuit 62K and LED head 63K. A resister array 61K is connected to the image processing section 31, and accepts the one line serial image data Dk sequentially and holds the input image data Dk according to the resister control signal SRk.

The latch circuit 62K is connected to the resister array 61K, and latches the image data Dk output from the resister array 61K in parallel according to the latch control signal SLk. The LED head 63K is connected to the latch circuit 62K. The LED head 63K is connected to the laser driving power source Vk. The LED head 63K generates an LED light array for one BK color line including various intensity of light all at once, based on the image data Dk of one line.

The LED light array for BK color exposes one line of the photoconductor drum 1K all at once, so as to form a linear electrostatic latent image. The linear electrostatic latent image formed on the photoconductor drum 1K is developed by the developing unit 4K shown in FIG. 1 with a BK color toner. The toner image for BK color developed by the developing unit 4K is transferred to the intermediate transfer body 6. The toner image transferred to the intermediate transfer body 6 is transferred to a predetermined recording medium P. Thus, a color image is formed.

Figure 12:
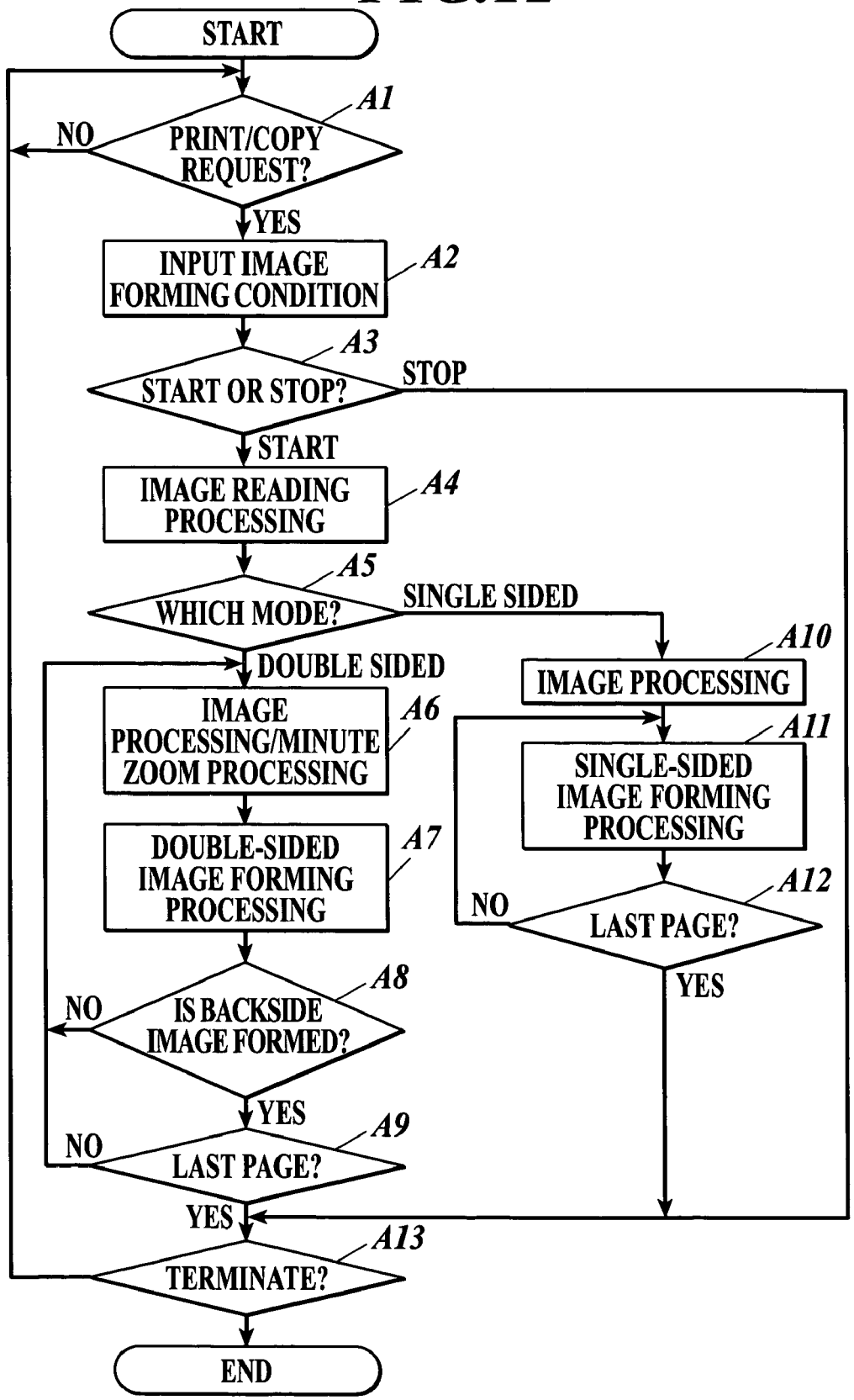
FIG. 12 is a flowchart showing an example of operation of the color copier 100.

Next, the operation of the color copier 100 controlled by the control section 15, i.e. image formation, is described. As shown in FIG. 12, the operation of the color copier 100 is composed of steps A1 to A13 which the control section 15 performs by controlling the sections.

As shown in FIG. 12, the control section 15 judges whether or not there is a printing request from the other computer through a communication section 19 or an image formation request such as printing and copying according to an operation on the operation panel 48. The control section 15 holds the processing until these requests are made (step A1).

When an image formation request is made (step A1: Yes), the control section 15 accepts an input of the image forming condition regarding the request according to a communication through the communication section 19 or an input on the operation panel 48, and stores the information to the paper type zoom ratio information 321 (step A2). The input of the image forming condition in step A2 includes the above-described setting on the operation panel 48. The processing for the printing request and copying request is basically identical, and the difference is only a point that the processing for copying request further includes an image reading processing. Thus, the processing for copying request is only described in the following, and the description to the processing for printing request is omitted.

Subsequently, the control section 15 judges which is directed between start and stop on the operation panel 48 or the like (step A3). When the start is directed, the control section 15 performs an image reading processing to read an image by the image input section 11 (step A4) and judges which the image formation mode is between a double-sided and single-sided mode (step A5).

When it is judged the image formation mode is a double-sided mode in step A5, the control section 15 performs image processing which includes calculation processing to calculate a data for adjusting an image which the image forming section 60 forms line by line in the main scanning direction onto each image forming side (front side/backside) of the recording medium, based on the data set on the operation panel 48 as the paper type zoom ratio information 321.

Here, the data calculation processing to adjust an image to be formed line by line in the main scanning direction on the image forming side of the recording medium P is described. The data calculation processing to adjust an image to be formed line by line in the main scanning direction on the image forming side of the recording medium P is to calculate a data for thinning out/insertion of a pixel of line data in the image processing section 31 corresponding to the $N^{th}$ line image formation in the sub scanning direction, to calculate a data for shifting (fine adjustment of the image forming position in the main scanning direction), and to calculate a data for delaying or reading ahead of the line data in the image processing section 31 (fine adjustment of the image forming position in the sub scanning direction). This data calculation processing is performed based on the image forming zoom ratio of the main scanning direction at each image forming position in the sub scanning direction, image forming zoom ratio of the sub scanning direction at each image forming position in the main scanning direction, displacement of an image forming position in the main scanning direction at each image forming position in the sub scanning direction, displacement of an image forming position in the sub scanning direction at each image forming position in the main scanning direction.

First, the data calculation for thinning out/insertion or for shifting of the $N^{th}$ line data in the sub scanning direction based on the image forming zoom ratio of the main scanning direction at each image forming position in the sub scanning direction is described. Regarding the data calculation, the zoom ratio such as the upper end zoom ratio H1 and lower end zoom ratio H2 set on the operation panel 48 is represented by a value where "one (1)" (normal condition) is deduced. Specifically, magnification of 1.01 times from the normal condition is denoted as 0.01.

The upper end zoom ratio H1 and lower end zoom ratio H2 denote image forming zoom ratios of upper and lower ends of the image forming area in the main scanning direction. The number of total lines in the sub scanning direction is denoted as HEIGHT. The zoom ratio of the main scanning direction at the $N^{th}$ line in the sub scanning direction is denoted as H(N). When the H(N) can be expressed by a primary function of N, i.e. when the image forming area is a trapezoid where the upper end is zoomed at the upper end zoom ratio H1 and the lower end is zoomed at the lower end zoom ratio is H2, the H(N) can be calculated from the following expression.

$H(N)=\{$upper end zoom ratio $H1\times$(HEIGHT$-N$)+ lower end zoom ratio $H2\times2\}$/HEIGHT=upper end zoom ratio $H1$+rate of zoom ratio change $H3\times N$ Provided that rate of zoom ratio change $H3=$(lower end zoom ratio $H2-$upper end zoom ratio $H1$)/ HEIGHT The data for shifting the line data of the $N^{th}$ line in the sub scanning direction denotes a cycle to change line number to be formed in the main scanning direction according to the line number in the sub scanning direction, i.e. denotes a cycle of thinning out or insertion of a pixel in main scanning direction. This data for shifting can be calculated from the upper end zoom ratio H1 and lower end zoom ratio H2 based on the above-described expression.

In order to form a laterally symmetric image, it is required to perform shifting in main scanning direction corresponding to the sub scanning directions. The data for a shift amount at the $N^{th}$ line SHIFT(N) can be calculated from the following expression.

SHIFT($N$)=(the number of lines in sub scanning direction)×(line width change in main scanning direction)×$N$/2

Provided that (line width change in main scanning direction)=rate of zoom ratio change $H3\times$(the number of lines in main scanning direction)

Next, the calculation of HSHIFT(N) is described, which is a shift amount of the line data at the $N^{th}$ line in the sub scanning direction, based on the displacement of an image forming position in the main scanning direction at each image forming position in the sub scanning direction set on the operation panel 48. When the HSHIFT(N) can be expressed by a primary function of N, i.e. when the image forming area is a parallelogram, the HSHIFT(N) can be calculated from the following expression.

$H$SHIFT($N$)=(rate of displacement change in main scanning direction)×$N$

Provided that (rate of displacement change in main scanning direction)=shift amount $H4$/(the number of lines in sub scanning direction)∝unit shift amount $H5$.

The calculations of the data for thinning out/insertion of a pixel and fine adjustment of the image forming position based on the image forming zoom ratio and displacement of sub scanning direction at each image forming position in the main scanning direction set on the operation panel 48 are similar to the above-described calculation, expect the main scanning direction and sub scanning direction are alternated each other. Specifically, the calculation of the fine adjustment of an image forming position in the sub scanning direction is as follows.

The right end zoom ratio H1$a$ and left end zoom ratio H2$a$ denote image forming zoom ratios of right and left ends in the sub scanning direction of the image forming area. The total line number in the sub scanning direction is denoted as WIDTH. The zoom ratio of the main scanning direction at the $N^{th}$ line in the sub scanning direction is denoted as W(M). When W(M) can be expressed by a primary function of M, i.e. when the image forming area is a trapezoid where the right end is zoomed at the right end zoom ratio H1$a$ and the left end is zoomed at the left end zoom ratio H2$a$, the W(M) can be calculated from the following expression.

$W(M)=\{$right end zoom ratio $H1a\times$(WIDTH$-M$)+left end zoom ratio $H2a\times M\}$/WIDTH=right end zoom ratio $H1a$+rate of zoom ratio change $H3a\times M$ Provided that rate of zoom ratio change $H3a=$(left end zoom ratio $H2a-$right end zoom ratio $H1a$)/ WIDTH A cycle to change line length to be formed in the sub scanning direction according to the image forming position in the main scanning direction based on the zoom ratio set on the operation panel 48 is expressed as 1/W(M), and can be calculated from the right end zoom ratio H1$a$ and left end zoom ratio H2$a$ based on the above-described expression. Thus, at the $M^{th}$ line in the main scanning direction, thinning out or insertion of a pixel is performed to the line data based in this calculated cycle. When a pixel is inserted, reading of the line data is switched to the line data for the antecedent position after the insertion regarding the $M^{th}$ line in the main scanning direction. When a pixel is thinning out, reading of the line data is switched to the line data for the later position after the thinning out regarding the $M^{th}$ line in the main scanning direction.

That is, a plurality of lines of data are read when an image is formed in the sub scanning direction at the $M^{th}$ line in the main scanning direction, so that the insertion and thinning out of a pixel is performed in the calculated cycle. Thus, an image can be formed where the length of lines in the sub scanning direction is adjusted.

In order to form a longitudinally symmetric image, it is required to perform shifting in the sub scanning direction corresponding to the main scanning direction. The data for the shift amount at the $M^{th}$ line, SHIFT(M) can be calculated from the following expression.

SHIFT(M)=(the number of lines in main scanning direction)×(line width change in sub scanning direction)×M/2

Provided that (line width change in sub scanning direction)=rate of zoom ratio change $H3a$×(the number of lines in sub scanning direction)

Next, the calculation of WSHIFT(M) which is a shift amount in sub scanning direction at the $M^{th}$ line in the main scanning direction, based on the displacement of an image forming position in the sub scanning direction at each image forming position in the main scanning direction set on the operation panel 48, is described. When the WSHIFT(M) can be expressed by a primary function of M, i.e. when the image forming area is a parallelogram, the WSHIFT(M) can be calculated from the following expression.

WSHIFT(M)=(rate of displacement change in sub scanning direction)×M

Provided that (rate of displacement change in sub scanning direction)=shift amount $H4a$/(the number of lines in main scanning direction)∝unit shift amount $H6$ That is, a plurality of line data are read when an image is formed in the sub scanning direction at the $M^{th}$ line in the main scanning direction, so that the antecedent or later line data is read based on the above-described shift amount in the sub scanning direction. Thus, the image forming position in the sub scanning direction can be adjusted.

Following to step A6, the control section 15 adjusts the image data Dy and the like which the image processing section 31 supplies to the image forming section 60, based on the above-described data for adjusting an image to be formed line by line in the main scanning direction in the image forming section 60. That is, the control section 15 performs the shifting of the line data in the image processing section 31 (adjustment in the main scanning direction), and the delay and reading ahead of line data when the line data is plural and each correspond to one line image in the main scanning direction (adjustment in the sub scanning direction). Thus, the control section 15 forms an image on each of the front side and backside according to the set image aspect set on the operation panel 48 (step A7). When the thinning out or insertion of a pixel is performed in the adjustments in the main and sub scanning direction, the phases of the pixels to perform the thinning out or insertion may be varied by using random numbers so as not to accord with each other.

Subsequently, the control section 15 judges whether an image is formed on the backside or not (step A8), and judges whether an image is formed on the last page or not (step A9). Thus, an image formation on the front side and backside is performed to the last page. The control section 15 judges the end of the processing, for example judges whether or not there is a direction of the next processing (step A13).

When it is judged the image formation mode is the single sided mode, the control section 15 performs the processing similar with the above-described step A6 based on the paper type zoom ratio information 321 set on step A2 (step A10) and performs a single side image forming processing to form an image on one side of the recording medium P based on the calculated data for adjusting an image to be formed line by line in the main scanning direction on the image forming section 60 (step A11). Subsequently, the control section 15 judges whether the image is formed on the last page (step A12). Thus, the control section 15 performs the image formation on the one side to the last page, and judges the end of the processing, for example judges whether or not there is a direction of the next processing (step A13).

As described above, according to the composition of the color copier 100, when an image is formed on the image forming section 60 based on the image data input from the image input section 11, the operation panel 48 accepts setting of the zoom ratio of the main scanning direction of the image to be formed on the recording medium P corresponding to positions in the sub scanning direction, and the control section 15 adjusts the data to drive the image forming section 60 output from the image processing section 31, based on the set zoom ratio so as to control the image formation on the image forming section 60.

Accordingly, when the color copier 100 performs an image formation on the recording medium P in such a manner that a length of the image in the main scanning direction changes according to positions in the sub scanning direction, the color copier 100 can form an image in conformity with the aspect of the recording medium P by setting the zoom ratio. Therefore, even when the recording medium P deforms in forming images on both sides of the recording medium P, the image aspect of the image to be formed on the front side and backside can be adjusted precisely in conformity with the distortion of the recording medium P.

Figure 13A:
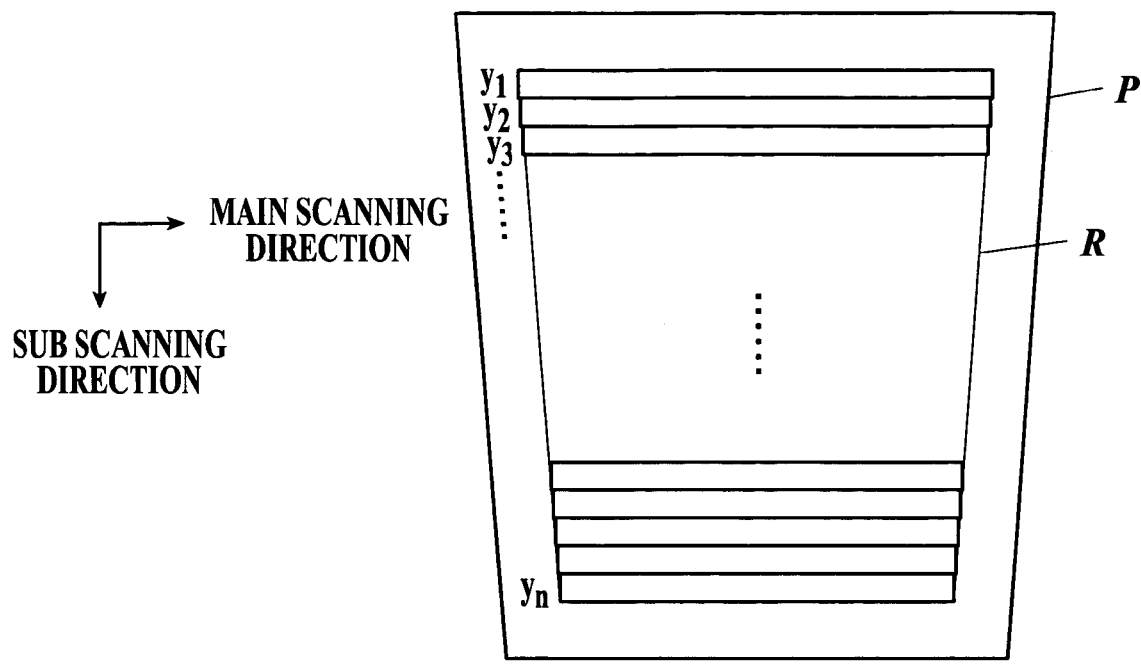
FIGS. 13A and 13B is each a conceptual view showing an image formed on the recording medium P which has been deformed into a trapezoid.

Specifically, when the recording medium P deforms into a trapezoid where the length in the main scanning direction varies as shown in FIG. 13A, an image can be formed in the manner that lines in the main scanning direction (y1 to yn) have lengths according to the respective positions in the sub scanning direction. Thus, the image can be formed on an image forming area R which corresponds to the recording medium P deformed into a trapezoid.

Further, according to the composition of the color copier 100, when an image is formed on the image forming section 60 based on the image data input from the image input section 11, the operation panel 48 accepts setting of the zoom ratio of the sub scanning direction of the image to be formed on the recording medium P corresponding to positions in the main scanning direction, and the control section 15 adjusts the data to drive the image forming section 60 output from the image processing section 31 based on the set zoom ratio so as to control the image formation on the image forming section 60.

Accordingly, when the color copier 100 performs an image formation on the recording medium P in such a manner that a length of the image in the sub scanning direction varies according to positions in the main scanning direction, the color copier 100 can form an image in conformity with the aspect of the recording medium P by setting the zoom ratio. Therefore, even when the recording medium P deforms in forming images on both sides of the recording medium P, the image aspect of the image to be formed on the backside can be adjusted precisely in conformity with the distortion of the recording medium P.

Figure 13B:
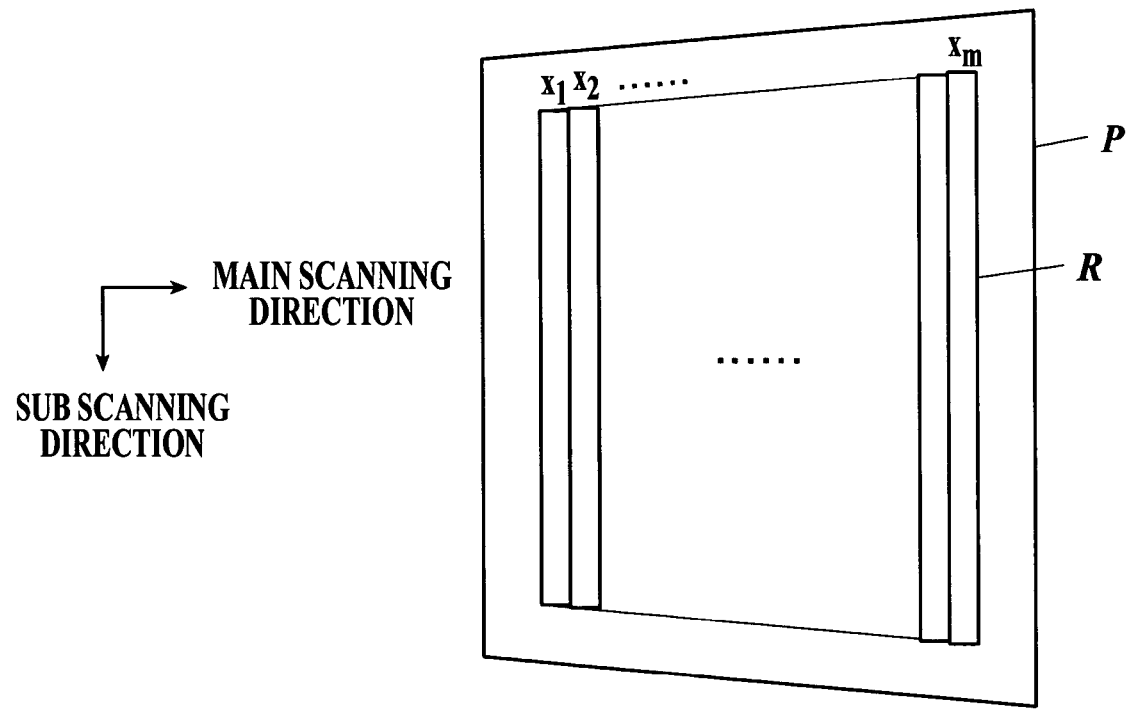

Specifically, when the recording medium P deforms into a trapezoid where the length in the sub scanning direction varies as shown in FIG. 13B, an image can be formed in the manner that lines in the main scanning direction (x1 to xn) have lengths according to the respective positions in the main scanning direction. Thus, the image can be formed on an image forming area R which corresponds to the recording medium P deformed into a trapezoid.

Further, according to the composition of the color copier 100, when an image is formed on the image forming section 60 based on the image data input from the image input section 11, the operation panel 48 accepts setting of the displacement in the main scanning direction of the image to be formed on the recording medium P corresponding to positions in the sub scanning direction, and the control section 15 adjusts the data to drive the image forming section 60 output from the image processing section 31 based on the set displacement so as to control the image formation on the image forming section 60.

Accordingly, when the color copier 100 performs an image formation on the recording medium P in such a manner that a position of the image in the main scanning direction changes according to positions in the sub scanning direction, the color copier 100 can form an image in conformity with the aspect of the recording medium P by setting the displacement. Therefore, even when the recording medium P deforms in forming images on both sides of the recording medium P, the image aspect of the image to be formed on the backside can be adjusted precisely in conformity with the distortion of the recording medium P.

Figure 14A:
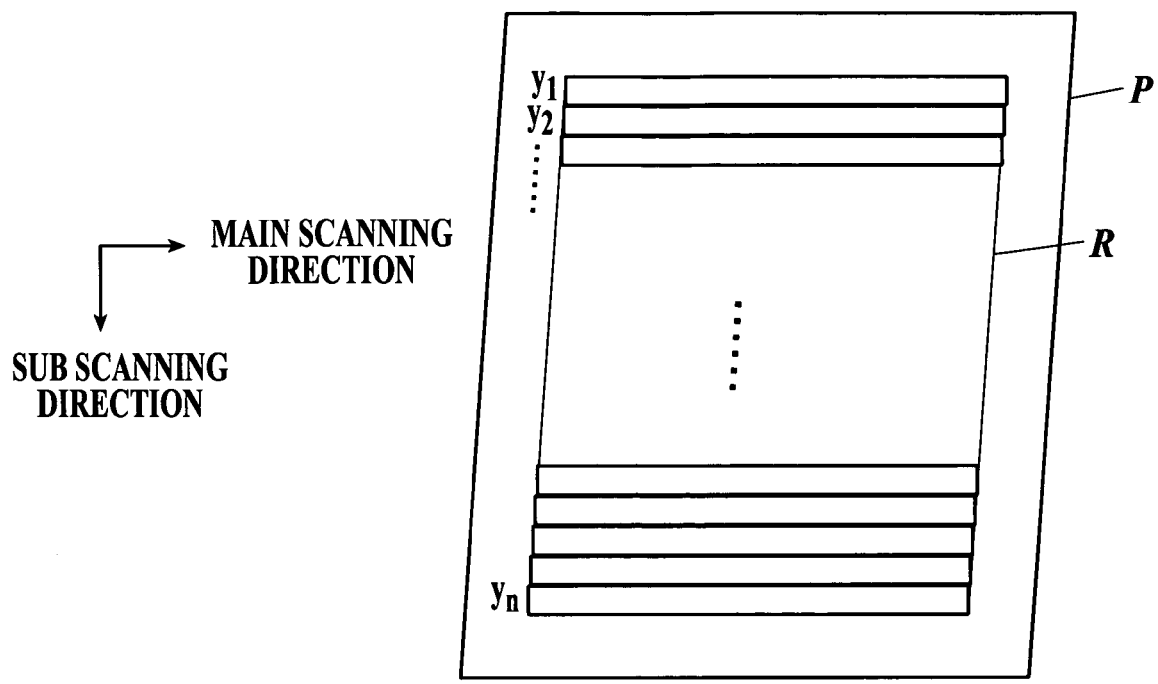
FIGS. 14A and 14B is each a conceptual view showing an image formed on the recording medium P which has been deformed into a parallelogram.

Specifically, when the recording medium P deforms into a parallelogram having a disagreement in the main scanning direction as shown in FIG. 14A, an image can be formed in the manner that lines in the sub scanning direction (y1 to yn) are formed on the shifted positions according to the respective positions in the sub scanning direction. Thus, the image can be formed on an image forming area R which corresponds to the recording medium P deformed into a parallelogram.

Further, according to the composition of the color copier 100, when an image is formed on the image forming section 60 based on the image data input from the image input section 11, the operation panel 48 accepts setting of the displacement in the sub scanning direction of the image to be formed on the recording medium P corresponding to positions in the main scanning direction, and the control section 15 adjusts the data to drive the image forming section 60 output from the image processing section 31 based on the set displacement so as to control the image formation on the image forming section 60. Accordingly, when the color copier 100 performs an image formation on the recording medium P in such a manner that a position of the image in the sub scanning direction changes according to positions in the main scanning direction, the color copier 100 can form an image in conformity with the aspect of the recording medium P by setting the displacement. Therefore, even when the recording medium P deforms in forming images on both sides of the recording medium P, the image aspect of the image to be formed on the backside can be adjusted precisely in conformity with the distortion of the recording medium P.

Figure 14B:
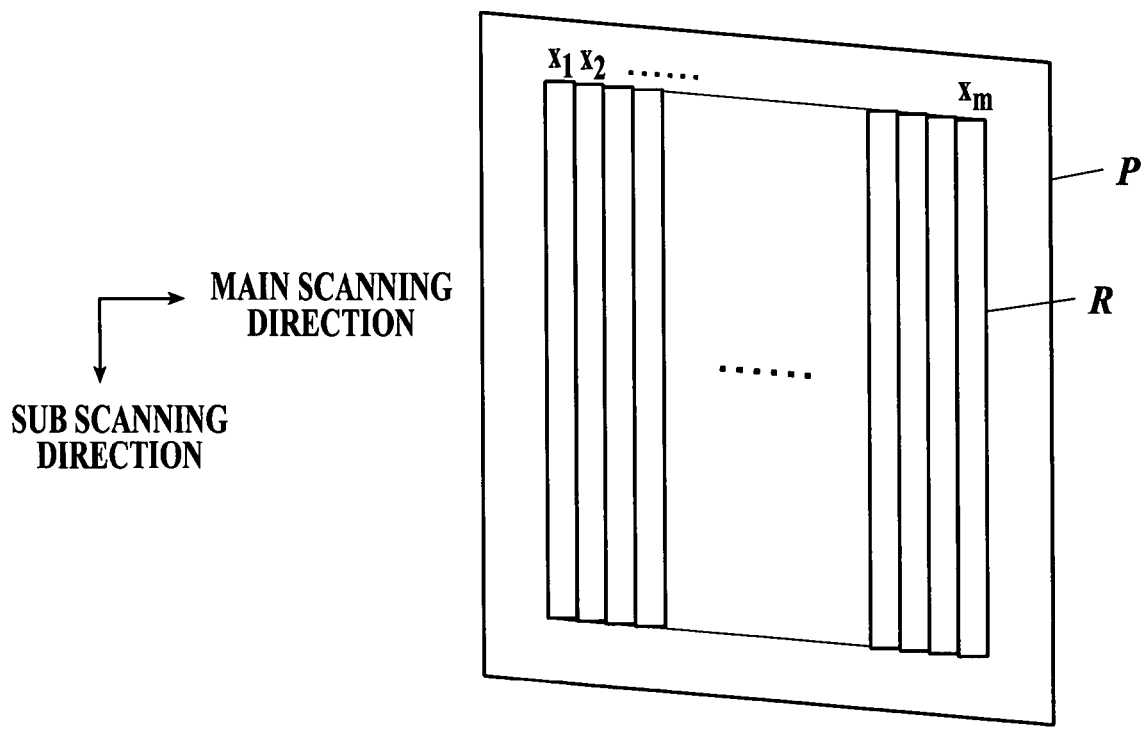

Specifically, when the recording medium P deforms into a parallelogram having a disagreement in the sub scanning direction as shown in FIG. 14B, an image can be formed in the manner that lines of the main scanning direction (x1 to xn) are formed on the shifted positions according to the respective positions in the sub scanning direction. Thus, the image can be formed on an image forming area R which corresponds to the recording medium P deformed into a parallelogram.

According to the composition of the color copier 100, the above-described zoom ratio and displacement in the main scanning direction are set with two zoom ratios of the main scanning direction at two positions in the sub scanning direction and two displacements in the main scanning direction at the two positions, and an image is formed at the zoom ratio/shift amount according to the position of the image in the sub scanning direction calculated from the set zoom ratios and displacements.

Thereby, only by setting the zoom ratios of the main scanning direction at two positions in the sub scanning direction and the displacements in the main scanning direction at the two positions, the color copier 100 can form an image in conformity with the aspect of the recording medium P. Thus, a user can easily set the configuration of the image to be formed on the recording medium P.

According to the composition of the color copier 100, the above-described zoom ratio and displacement are set with the rate of zoom ratio change and rate of displacement change in the sub scanning direction according to the positions in the sub scanning direction, and an image is formed at the zoom ratio/shift amount according to the positions of the image in the sub scanning direction calculated from the set rate of zoom ratio change and displacement change.

Thereby, only by setting the rate of zoom ratio change and displacement change according to the positions in the sub scanning direction, the color copier 100 can form an image in conformity with the aspect of the recording medium P. Thus, a user can easily set the configuration of the image to be formed on the recording medium P.

According to the composition of the color copier 100, the above-described zoom ratio and displacement in the sub scanning direction are set with two zoom ratios of the sub scanning direction at two positions in the main scanning direction and two displacements in the sub scanning direction at the two positions, and an image is formed at the zoom ratio/shift amount according to the positions of the image in the sub scanning direction calculated from the set zoom ratios and displacements.

Thereby, only by setting the zoom ratios of the sub scanning direction at two positions in the main scanning direction and the displacements in the sub scanning direction at the two positions, the color copier 100 can form an image in conformity with the aspect of the recording medium P. Thus, a user can easily set the configuration of the image to be formed on the recording medium P.

According to the composition of the color copier 100, the above-described zoom ratio and displacement are set with the rate of zoom ratio change and rate of displacement change in the sub scanning direction according to the positions in the main scanning direction, and an image is formed at the zoom ratio/shift amount according to the positions of the image in the main scanning direction calculated from the set rate of zoom ratio change and displacement change.

Thereby, only by setting the rate of zoom ratio change and displacement change according to the positions in the main scanning direction, the color copier 100 can form an image in conformity with the aspect of the recording medium P. Thus, a user can easily set the configuration of the image to be formed on the recording medium P.

According to the composition of the color copier 100, the paper type zoom ratio information 321 stores configuration information of the recording medium P with respect to each type of the recording medium P, and the above-described zoom ratios and shift amounts in the main and sub scanning directions are read from the paper type zoom ratio information 321 and are set them with respect to each type of the recording medium P. Thereby, according to the color copier 100, configuration of an image to be formed can be easily set with respect to each type of the recording medium P such as the material thereof.

The color copier 100 comprises a plurality of the sheet feeding trays 20A, 20B and 20C to store the recording medium P, and the carrying section 20 to carry the recording medium P from the sheet feeding trays to the image forming section 60. The color copier 100 stores the configuration information with respect to each sheet feeding tray in the paper type zoom ratio information 321, and sets the above-described configuration of the zoom ratio and shift amount in the main and sub scanning direction with respect to each sheet feeding tray. Thereby, according to the color copier 100, the configuration of the image to be formed can be easily set with respect to each sheet feeding tray to feed the recording medium P.

According to the composition of the color copier 100, the configuration information is stored in the paper type zoom ratio information 321 with respect to each of the front side and backside which are image forming planes of the recording medium P, and the above-described zoom ratios and shift amounts in the main and sub scanning directions are read from the paper type zoom ratio information 321 and are set them with respect to each of the front side and backside. Thereby, according to the color copier 100, configuration of an image to be formed can be easily set with respect to each of the front side and backside.

In the above-described embodiment, an image position and aspect adjustment can be set in conformity with the aspect (including the deformed aspect) of the recording medium with respect to each of the front side and backside in a highly flexible manner. A user can set whether the adjustment of the image position and aspect is applied to an image formation on the front side, or on the backside, or on both of them, according to the status of use. For example, in the case where images are formed on both sides of a recording medium having a precise rectangle shape, the recording medium is not deformed at the image formation on the front side since it has not passed through the fixing device, while the recording medium is deformed at the image formation on the backside since the image formation on the front side has finished and the recording medium has passed through the fixing device. Accordingly, it is preferable not to set the zoom ratio and shift amount on the front side, but to set them only on the backside.

The description to the present embodiment is to show one example of the invention, and the present invention is not limited thereto. Regarding the composition and operation of the color copier 100 of the present embodiment can be modified optionally within the spirit of the present invention.

For example, according to the color copier 100, the change of the zoom ratio and displacement is calculated with a primary function as an example in calculating the data for adjusting the image to be formed line by line in the main scanning direction onto the image forming plane of the recording medium P. The function is not limited specifically, and may be a secondary function or exponential function.

According the above embodiment, when it is required to form an image onto the recording medium in the manner that the length in the main scanning direction changes according to the position in the sub scanning direction, the zoom ratio of the main scanning direction can be set according to the position in the image in the sub scanning direction. Thus, it is possible to perform a precise image formation in conformity with a distortion of the recording medium or the like.

According the above embodiment, when it is required to form an image onto the recording medium in the manner that the position in the main scanning direction shifts according to the position in the sub scanning direction, the displacement of the main scanning direction can be set according to the position in the image in the sub scanning direction. Thus, it is possible to perform a precise image formation in conformity with a distortion of the recording medium or the like.

According the above embodiment, when it is required to form an image onto the recording medium in the manner that the length in the sub scanning direction changes according to the position in the main scanning direction, the zoom ratio of the sub scanning direction can be set according to the position in the image in the main scanning direction. Thus, it is possible to perform a precise image formation in conformity with a distortion of the recording medium or the like.

According the above embodiment, when it is required to form an image onto the recording medium in the manner that the position in the sub scanning direction shifts according to the position in the main scanning direction, the displacement of the sub scanning direction can be set according to the position in the image in the main scanning direction. Thus, it is possible to perform a precise image formation in conformity with a distortion of the recording medium or the like.

What is claimed is:

1. An image forming apparatus comprising:
    an image forming section to perform an image formation onto a recording medium which moves relatively in a sub scanning direction, the image forming section comprising a writing unit including a writing element;
    an image processing section to convert data for driving the writing unit based on input image data;
    a zoom ratio setting section to set zoom ratios of an image in a main scanning direction respectively associated with positions in the image in the sub scanning direction at the image formation to the recording medium; and
    a controlling section to control the image formation in the writing unit, based on the data for driving the writing unit which has been converted in the image processing section based on the zoom ratio set on the zoom ratio setting section;
    wherein the zoom ratio setting section sets a first zoom ratio which is a zoom ratio of the image in the main scanning direction at a first position of the image in the sub scanning direction and a second zoom ratio which is a zoom ratio of the image in the main scanning direction at a second position different from the first position of the image in the sub scanning direction, and
    wherein the controlling section calculates the zoom ratio of the image in the main scanning direction at a plurality of positions in the image in the sub scanning direction based on the first and second zoom ratio set on the zoom ratio setting section, and controls the image formation on the writing unit based on the calculated zoom ratios.

2. The image forming apparatus of claim 1, further comprising:
    a memory to store configuration information for each type of the recording medium,
    wherein the zoom ratio setting section reads out the configuration information for each type of the recording medium, so as to set the zoom ratio.

3. The image forming apparatus of claim 1, further comprising:
    a carrying section to carry the recording medium from a plurality of sheet feeding trays to the writing unit; and
    a memory to store configuration information for each of the sheet feeding trays,
    wherein the zoom ratio setting section reads out the configuration information for each of the sheet feeding trays, so as to set the zoom ratio.

4. The image forming apparatus of claim 1, further comprising:
    a memory to store configuration information for each image forming plane of the recording medium,
    wherein the zoom ratio setting section reads out the configuration information for each image forming plane of the recording medium, so as to set the zoom ratio.

5. An image forming apparatus comprising:
    an image forming section to perform an image formation onto a recording medium which moves relatively in a sub scanning direction, the image forming section comprising a writing unit including a writing element;

an image processing section to convert data for driving the writing unit based on input image data;

a zoom ratio setting section to set zoom ratios of an image in a main scanning direction respectively associated with positions in the image in the sub scanning direction at the image formation to the recording medium; and a controlling section to control the image formation in the writing unit, based on the data for driving the writing unit which has been converted in the image processing section based on the zoom ratio set on the zoom ratio setting section;

wherein the zoom ratio setting section sets a zoom ratio of the image in the main scanning direction at a position in the image in the sub scanning direction and a rate of change of the zoom ratio with respect to a change of the position in the image in the sub scanning direction, and wherein the controlling section calculates the zoom ratio of the image in the main scanning direction at a plurality of positions in the image in the sub scanning direction based on first and second zoom ratios set by the zoom ratio setting section, and controls the image formation on the writing unit based on the calculated zoom ratios.

6. An image forming apparatus comprising:

an image forming section to perform an image formation onto a recording medium which moves relatively in a sub scanning direction, the image forming section comprising a writing unit including a writing element;

an image processing section to convert data for driving the writing unit based on input image data;

a zoom ratio setting section to set zoom ratios of an image in a main scanning direction respectively associated with positions in the image in the sub scanning direction at the image formation to the recording medium;

a controlling section to control the image formation in the writing unit, based on the data for driving the writing unit which has been converted in the image processing section based on the zoom ratio set on the zoom ratio setting section; and a shift amount setting section to set a displacement of the image in the main scanning direction associated with a position in the image in the sub scanning direction, wherein the controller controls the image formation on the writing unit based on the displacement set on the shift amount setting section, wherein the shift amount setting section sets a first displacement and a second displacement of the image in the main scanning direction respectively at different positions of the image in the sub scanning direction, and wherein the controlling section calculates shift amounts of the image in the main scanning direction at a plurality of positions in the image in the sub scanning direction based on the set displacement, and controls the image formation so that the image shifts in the main scanning direction based on the shift amount.

7. An image forming apparatus comprising:

an image forming section to perform an image formation onto a recording medium which moves relatively in a sub scanning direction, the image forming section comprising a writing unit including a writing element;

an image processing section to convert data for driving the writing unit based on input image data;

a zoom ratio setting section to set zoom ratios of an image in a main scanning direction respectively associated with positions in the image in the sub scanning direction at the image formation to the recording medium;

a controlling section to control the image formation in the writing unit, based on the data for driving the writing unit which has been converted in the image processing section based on the zoom ratio set on the zoom ratio setting section; and a shift amount setting section to set a displacement of the image in the main scanning direction associated with a position in the image in the sub scanning direction, wherein the controller controls the image formation on the writing unit based on the displacement set on the shift amount setting section, wherein the shift amount setting section sets a rate of change of the displacement of the image in the main scanning direction with respect to a change of a position in the image in the sub scanning direction, and wherein the controller calculates a shift amount of the image in the main scanning direction from the rate of change of the displacement set on the shift amount setting section, and controls the image formation so that the image shifts in the main scanning direction based on the shift amount.

8. An image forming apparatus comprising:

an image forming section to perform an image formation onto a recording medium which moves relatively in a main scanning direction, the image forming section comprising a writing unit including a writing element;

an image processing section to convert data for driving the writing unit based on input image data;

a zoom ratio setting section to set zoom ratios of an image in a sub scanning direction respectively associated with a position in the image in the main scanning direction at the image formation to the recording medium; and a controlling section to control the image formation in the writing unit, based on the data for driving the writing unit which has been converted in the image processing section based on the zoom ratio set on the zoom ratio setting section, wherein the zoom ratio setting section sets a first zoom ratio which is a zoom ratio of the image in the sub scanning direction at a first position of the image in the main scanning direction and a second zoom ratio which is a zoom ratio of the image in the sub scanning direction at a second position different from the first position of the image in the main scanning direction, and wherein the controlling section calculates the zoom ratio of the image in the sub scanning direction at a plurality of positions in the image in the main scanning direction based on the first and second zoom ratio set on the zoom ratio setting section, and controls the image formation on the writing unit based on the calculated zoom ratios.

9. The image forming apparatus of claim 8, further comprising:

a memory to store configuration information for each type of the recording medium, wherein the zoom ratio setting section reads out the configuration information for each type of the recording medium, so as to set the zoom ratio.

10. The image forming apparatus of claim 8, further comprising:

a carrying section to carry the recording medium from a plurality of sheet feeding trays to the writing unit; and a memory to store configuration information for each of the sheet feeding trays, wherein the zoom ratio setting section reads out the configuration information for each of the sheet feeding trays, so as to set the zoom ratio.

11. The image forming apparatus of claim 8, further comprising:

a memory to store configuration information for each image forming plane of the recording medium, wherein the zoom ratio setting section reads out the configuration information for each image forming plane of the recording medium, so as to set the zoom ratio.

12. An image forming apparatus comprising:

an image forming section to perform an image formation onto a recording medium which moves relatively in a main scanning direction, the image forming section comprising a writing unit including a writing element;

an image processing section to convert data for driving the writing unit based on input image data;

a zoom ratio setting section to set zoom ratios of an image in a sub scanning direction respectively associated with a position in the image in the main scanning direction at the image formation to the recording medium; and a controlling section to control the image formation in the writing unit, based on the data for driving the writing unit which has been converted in the image processing section based on the zoom ratio set on the zoom ratio setting section, wherein the zoom ratio setting section sets a zoom ratio of the image in the sub scanning direction at a position in the image in the main scanning direction and a rate of change of the zoom ratio with respect to a change of the position in the image in the main scanning direction, and wherein the controlling section calculates the zoom ratio of the image in the sub scanning direction at a plurality of positions in the image in the main scanning direction based on first and second zoom ratios set by the zoom ratio setting section, and controls the image formation on the writing unit based on the calculated zoom ratios.

13. An image forming apparatus comprising:

an image forming section to perform an image formation onto a recording medium which moves relatively in a main scanning direction, the image forming section comprising a writing unit including a writing element;

an image processing section to convert data for driving the writing unit based on input image data;

a zoom ratio setting section to set zoom ratios of an image in a sub scanning direction respectively associated with a position in the image in the main scanning direction at the image formation to the recording medium;

a controlling section to control the image formation in the writing unit, based on the data for driving the writing unit which has been converted in the image processing section based on the zoom ratio set on the zoom ratio setting section; and a shift amount setting section to set a displacement of the image in the sub scanning direction associated with a position in the image in the main scanning direction, wherein the controller controls the image formation on the writing unit based on the displacement set on the shift amount setting section, wherein the shift amount setting section sets a first displacement and a second displacement of the image in the sub scanning direction respectively at different positions of the image in the main scanning direction, and wherein the controlling section calculates shift amounts of the image in the sub scanning direction at a plurality of positions in the image in the main scanning direction based on the set displacement, and controls the image formation so that the image shifts in the sub scanning direction based on the shift amount.

14. An image forming apparatus comprising:

an image forming section to perform an image formation onto a recording medium which moves relatively in a main scanning direction, the image forming section comprising a writing unit including a writing element;

an image processing section to convert data for driving the writing unit based on input image data;

a zoom ratio setting section to set zoom ratios of an image in a sub scanning direction respectively associated with a position in the image in the main scanning direction at the image formation to the recording medium;

a controlling section to control the image formation in the writing unit, based on the data for driving the writing unit which has been converted in the image processing section based on the zoom ratio set on the zoom ratio setting section; and a shift amount setting section to set a displacement of the image in the sub scanning direction associated with a position in the image in the main scanning direction, wherein the controller controls the image formation on the writing unit based on the displacement set on the shift amount setting section, wherein the shift amount setting section sets a rate of change of the displacement of the image in the sub scanning direction with respect to a change of a position in the image in the main scanning direction, and wherein the controller calculates a shift amount of the image in the sub scanning direction from the rate of change of the displacement set on the shift amount setting section, and controls the image formation so that the image shifts in the sub scanning direction based on the shift amount.

* * * * *